(12) United States Patent
Nagasaka et al.

(10) Patent No.: US 6,982,632 B2
(45) Date of Patent: Jan. 3, 2006

(54) VEHICLE ENGINE STARTING APPARATUS

(75) Inventors: Chikao Nagasaka, Aichi (JP); Toru Nakamura, Aichi (JP); Toshiyuki Isogai, Aichi (JP); Shinji Kishida, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/422,414

(22) Filed: Apr. 24, 2003

(65) Prior Publication Data

US 2004/0004398 A1    Jan. 8, 2004

(30) Foreign Application Priority Data

Apr. 24, 2002  (JP) .............................. 2002-122872
Apr. 24, 2002  (JP) .............................. 2002-122873

(51) Int. Cl.
*B60R 25/10*    (2006.01)
(52) U.S. Cl. ................. 340/426.3; 340/426.1; 340/438; 307/10.5
(58) Field of Classification Search ........... 340/438, 340/426.1, 426.3, 5.2, 5.32, 5.33, 5.61, 5.64, 340/426.13; 307/10.1, 10.5, 10.2; 701/36
See application file for complete search history.

(56) References Cited

U.S. PATENT DOCUMENTS

| 4,809,199 | A | * | 2/1989 | Burgess et al. ............. 340/5.21 |
| 5,656,867 | A | * | 8/1997 | Kokubu ..................... 307/10.5 |
| 5,718,326 | A |   | 2/1998 | Larose et al. |
| 5,821,631 | A | * | 10/1998 | Loraas et al. ................ 340/5.3 |
| 6,573,615 | B1 | * | 6/2003 | Asakura et al. ............... 307/9.1 |
| 6,708,086 | B2 | * | 3/2004 | Richard ........................ 701/1 |
| 6,713,895 | B1 | * | 3/2004 | Krapfl ....................... 307/10.1 |
| 6,776,016 | B1 |   | 8/2004 | Wittwer et al. |
| 2002/0008718 | A1 |   | 1/2002 | Obradovich |

FOREIGN PATENT DOCUMENTS

| DE | 196 41 898 C1 | 11/1997 |
| DE | 199 39 733 A1 | 3/2001 |
| EP | 1 184 236 A2 | 3/2002 |
| JP | 2004-120097 A | * 4/2004 |

* cited by examiner

*Primary Examiner*—Anh V. La
(74) *Attorney, Agent, or Firm*—Crompton, Seager & Tufte, LLC

(57) ABSTRACT

A vehicle engine starting apparatus has an engine start switch, a display device and a microcomputer. The display device shows the location of the start switch. The microcomputer identifies a specific signal, and controls the display device in accordance with the result of the identification executed by the microcomputer.

21 Claims, 26 Drawing Sheets

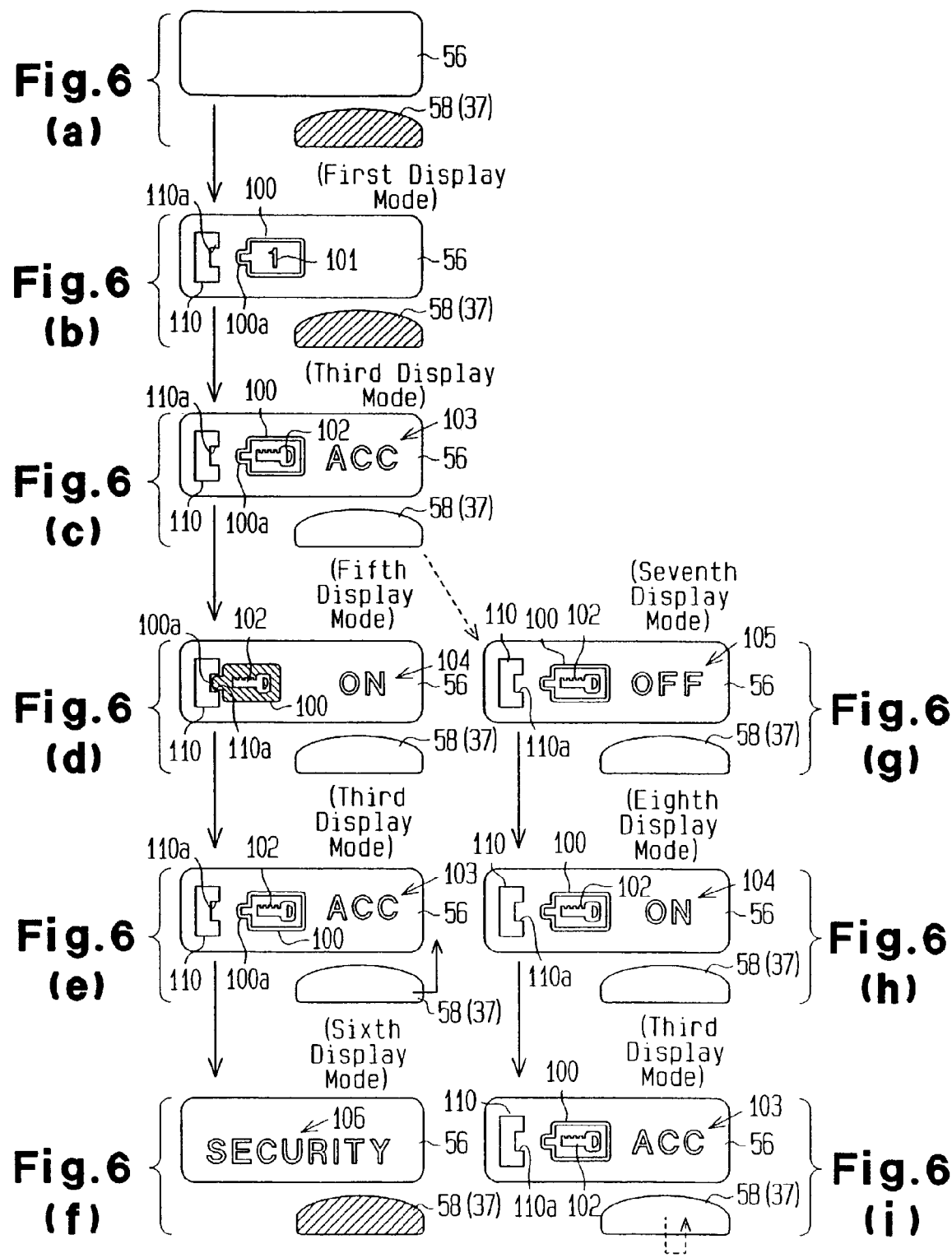

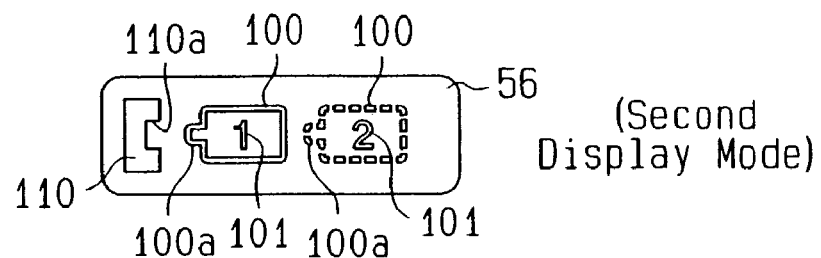
Fig.7(a)  (Second Display Mode)
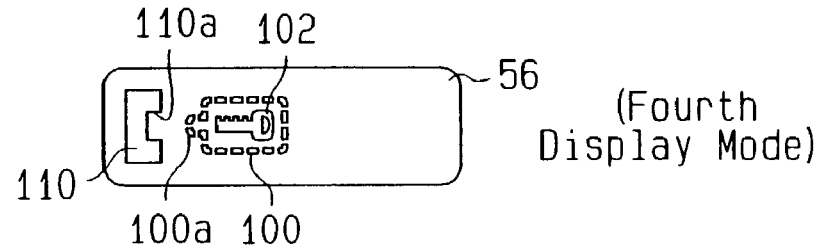
Fig.7(b)  (Fourth Display Mode)
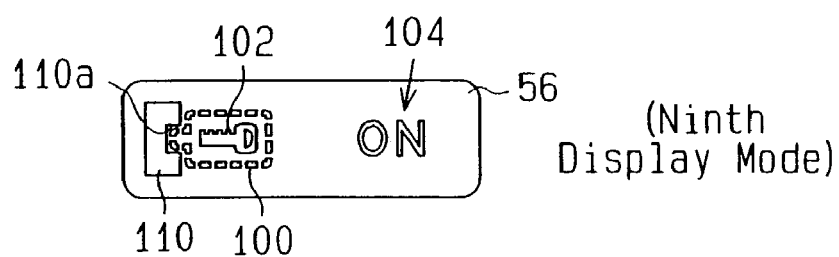
Fig.7(c)  (Ninth Display Mode)
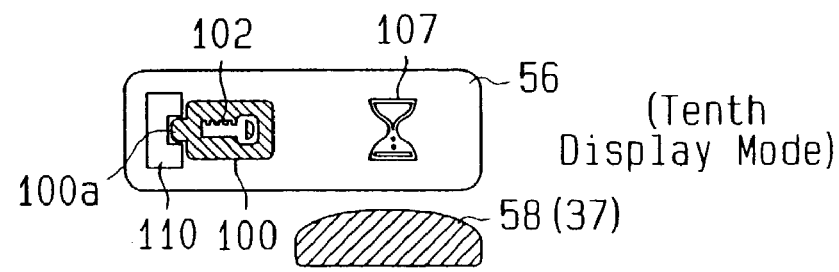
Fig.7(d)  (Tenth Display Mode)

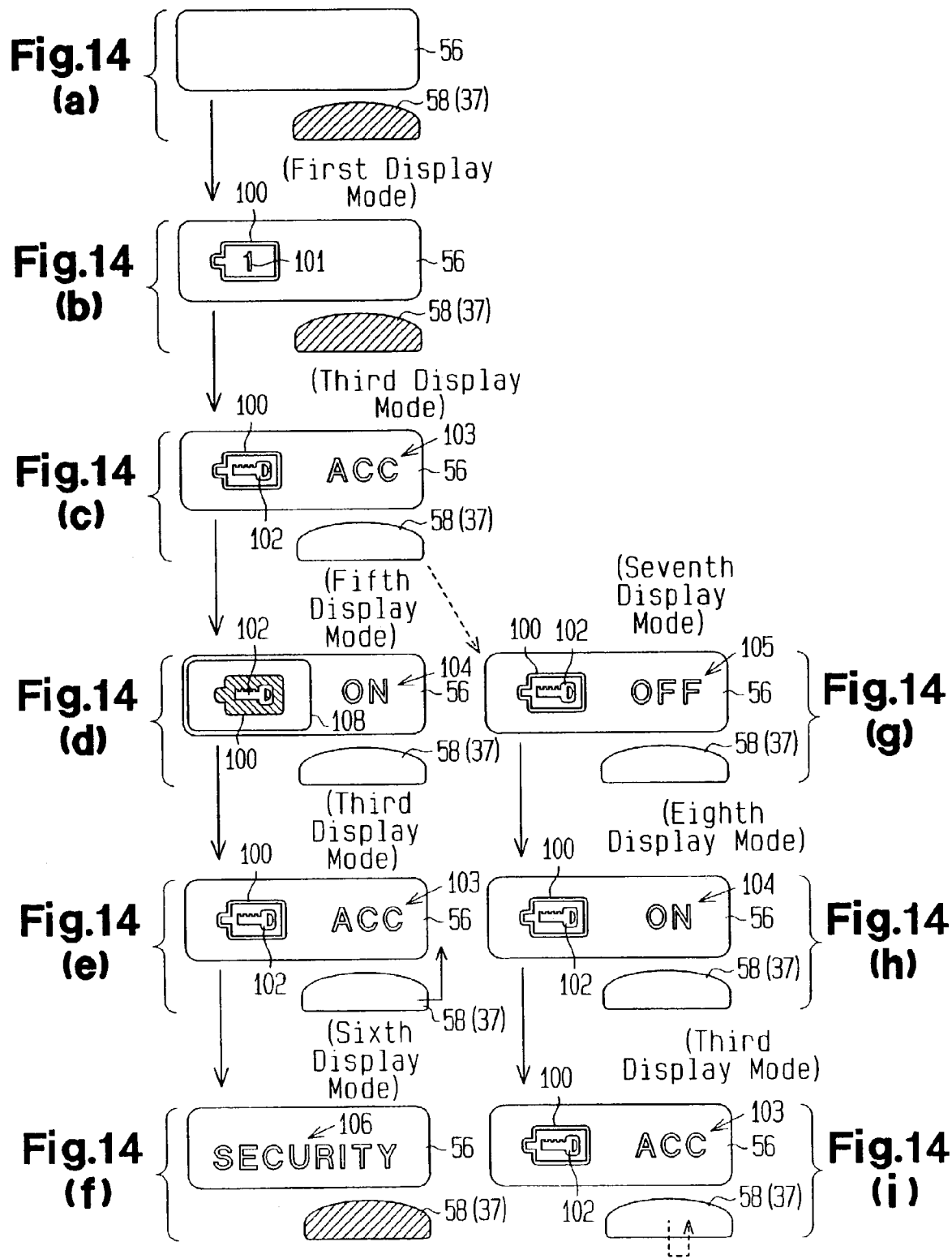

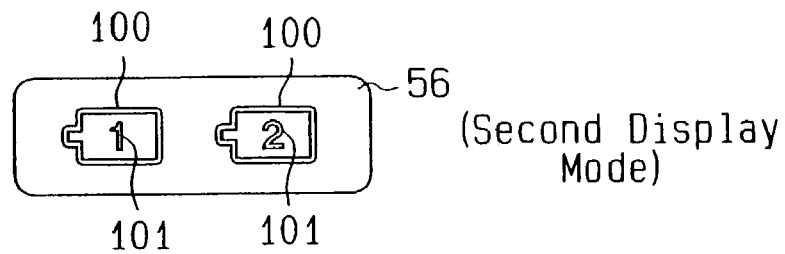
Fig.15(a)  (Second Display Mode)
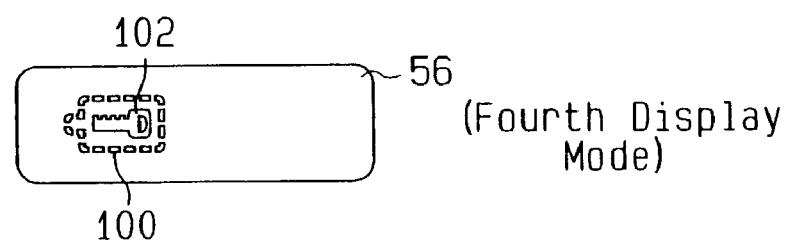
Fig.15(b)  (Fourth Display Mode)
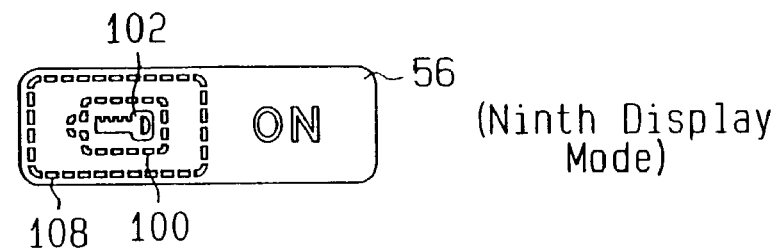
Fig.15(c)  (Ninth Display Mode)
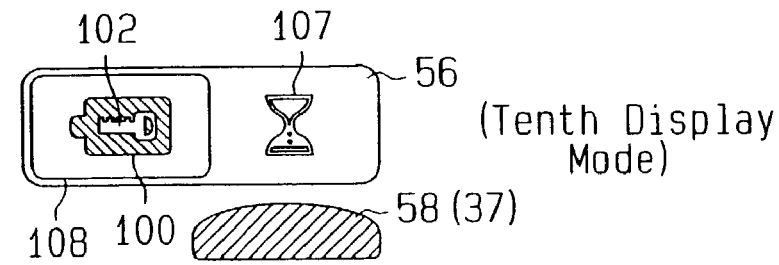
Fig.15(d)  (Tenth Display Mode)

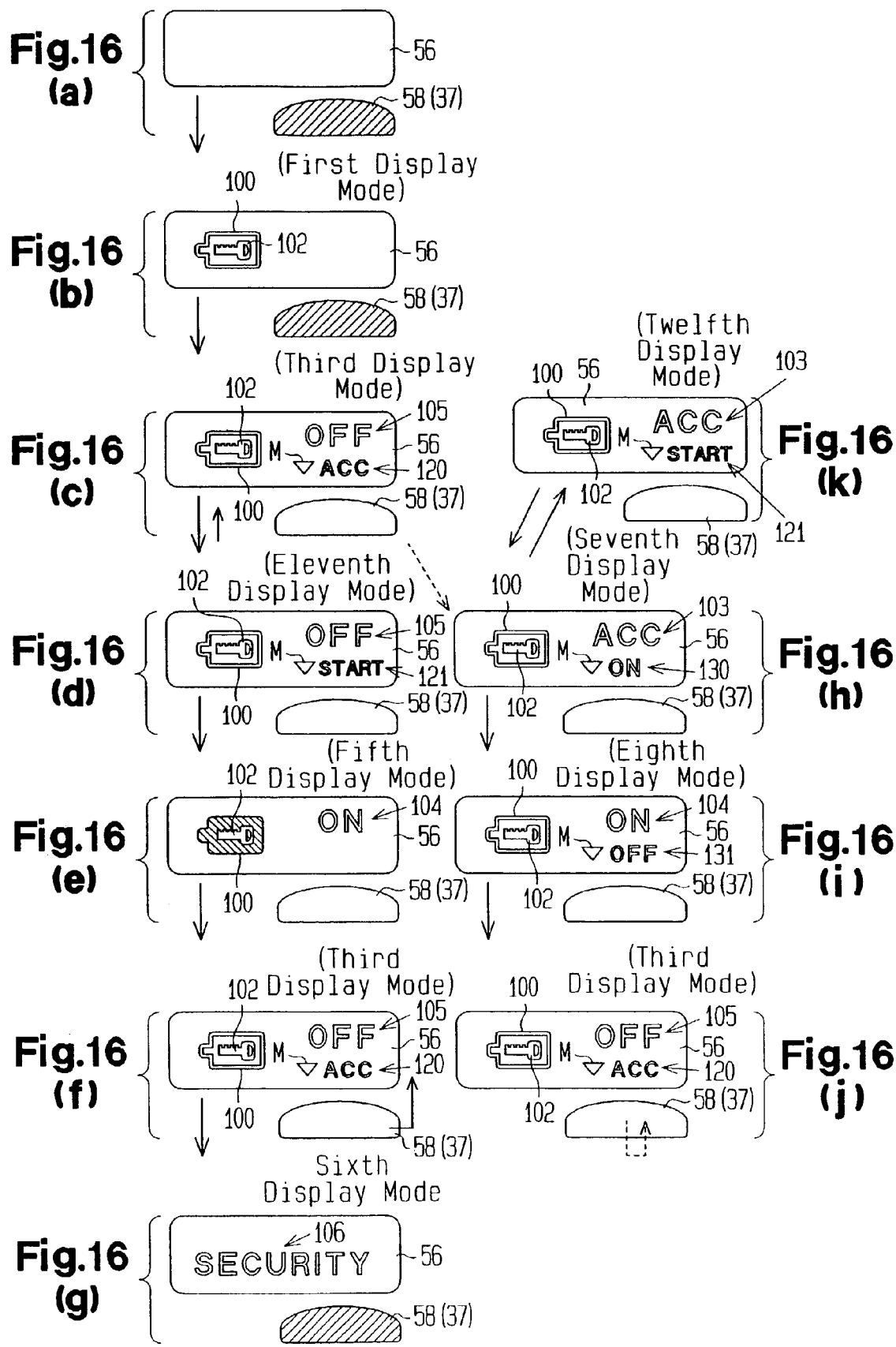

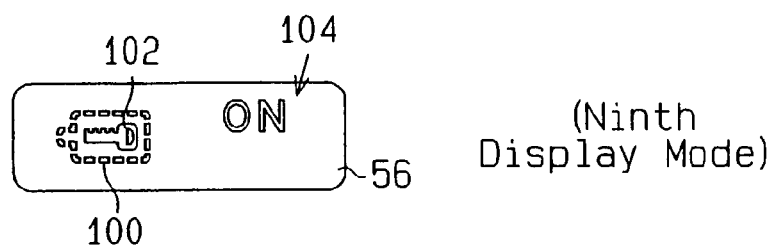
Fig.17(a) (Ninth Display Mode)
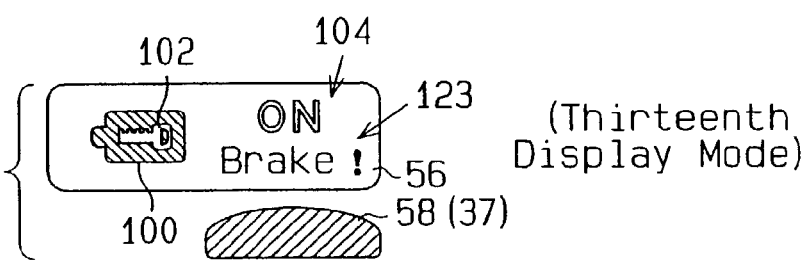
Fig.17(b) (Thirteenth Display Mode)
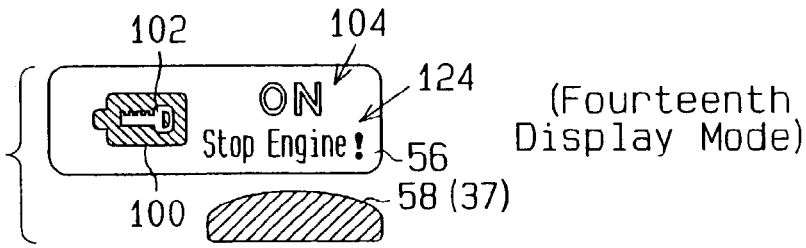
Fig.17(c) (Fourteenth Display Mode)
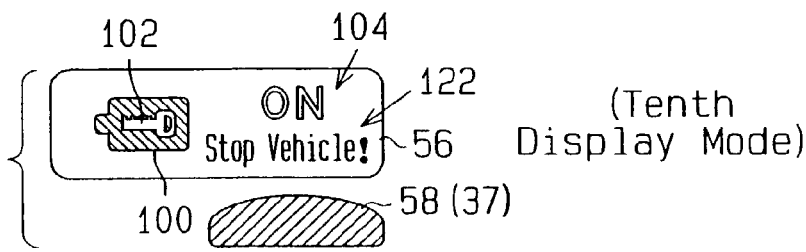
Fig.17(d) (Tenth Display Mode)

(Sixth Display Mode)

Fig.26(a) (Eleventh Display Mode)
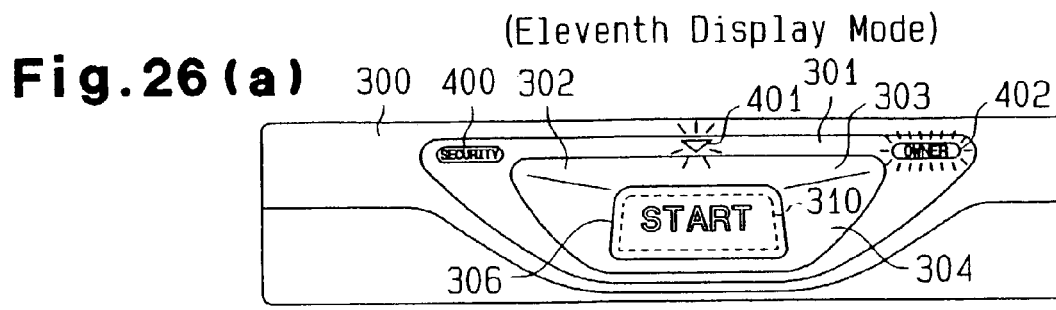
Fig.26(b) (Fifth Display Mode)
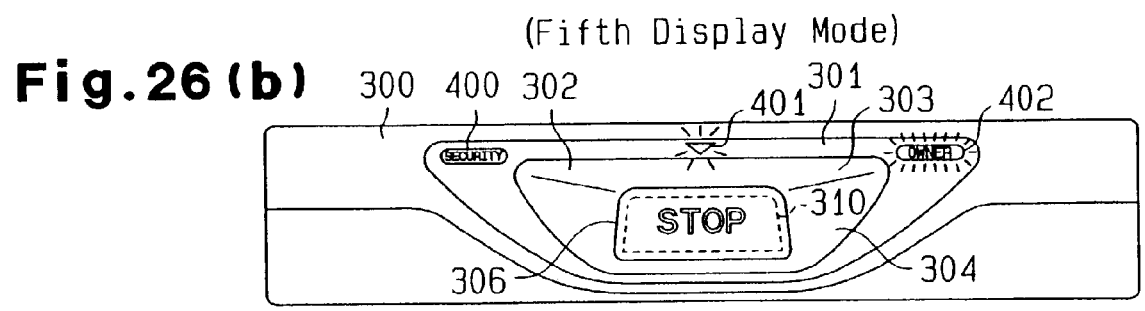
Fig.26(c) (Seventh Display Mode)
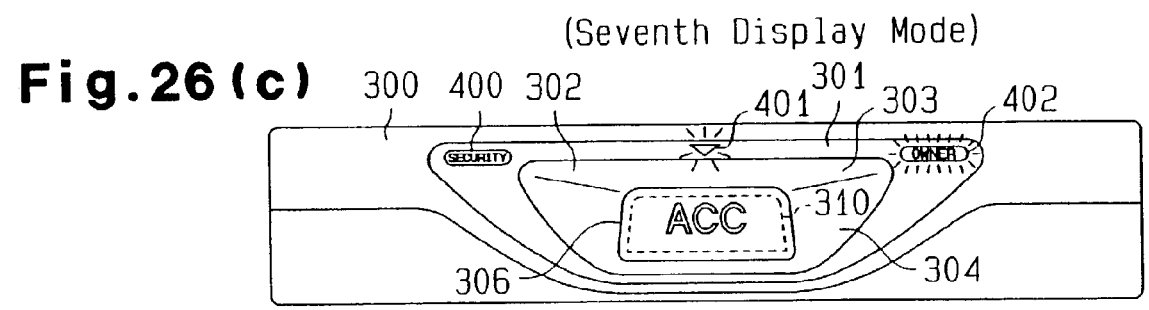
Fig.26(d) (Eighth Display Mode)
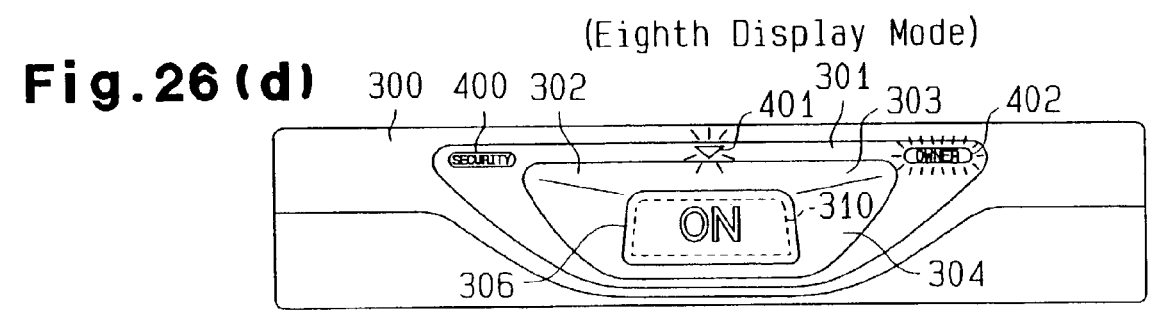
Fig.26(e)
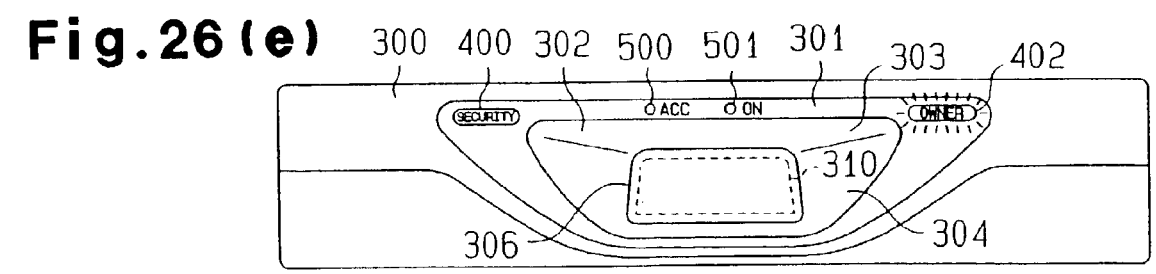

(Sixth Display Mode)

(Eleventh Display Mode)

VEHICLE ENGINE STARTING APPARATUS

BACKGROUND OF THE INVENTION

The present invention relates to a vehicle engine starting apparatus.

In recent years, there is a demand for an improved operability of vehicles in addition to demands for improved basic performances and safety of vehicles. For example, a vehicle engine starting apparatus called "smart ignition" system has been proposed. The smart ignition system enables a driver to start and stop the engine of a vehicle without using keys.

A typical vehicle engine starting apparatus includes a portable communication device carried by an occupant such as a driver of a vehicle, a communication controller mounted on the vehicle, and an engine start switch (ignition switch) provided in the passenger compartment (for example, a side of a steering wheel that faces the driver's seat). When the driver gets in the vehicle, an ID code assigned to the communication device is automatically checked against an ID code assigned to the communication controller. If the ID codes match, the communication controller permits the engine to be started. If the engine start switch is manipulated in this state, the engine is started. Therefore, the vehicle engine starting apparatus eliminates the necessity for inserting a mechanical key into a key hole and for turning it to start the engine. This improves the operability of the vehicle. Further, since the ID codes are verified, the levels of security are improved.

A typical vehicle engine starting apparatus uses an external light to show the location of the engine start switch. The external light is turned on when a door of the vehicle is opened, and then is turned off by a timer when a predetermined period elapses. However, even if the ID codes cannot be verified due to, for example, a malfunction of the communication device, the external light is turned on to show the location of the engine start switch, and thus encourages manipulation of the engine start switch.

A typical engine start switch is a rotatable knob. The engine is started and stopped by rotating the engine start switch.

If the rotatable switch is arranged in the center cluster of the instrument panel, the operability is inferior to a case in which the switch is provided on a side of the steering wheel that faces the driver's seat. For example, if the rotatable switch is provided in the center cluster of a car with a right-hand steering wheel, a right-handed driver has difficulty manipulating the switch since the driver has to use the left hand. Also, it is difficult to coordinate rotational switches with the switches of electrical devices in the center cluster. This adversely affects the appearance of the center cluster.

Accordingly, when the engine start switch is provided in the center cluster, a push switch, which is easy to manipulate, is used. However, a push switch for starting the engine needs to be clearly distinguished from the other switches of electric devices located in the center cluster.

Particularly, most of the switches in the center cluster have a top surface parallel to the surface of the instrument panel and project at the same height from the panel surface. Therefore, for occupants of the vehicle, the switches are not easily distinguished.

SUMMARY OF THE INVENTION

Accordingly, it is an objective of the present invention to provide an engine starting apparatus that clearly shows the location of an engine start switch.

To achieve the above objective, the present invention provides a vehicle engine starting apparatus. The apparatus has a start switch, a display device, an identify device, and a control device. The start switch starts the engine of the vehicle. The display device shows the location of the start switch. The identify device identifies a specific signal. The control device controls the display device in accordance with the result of the identification executed by the identify device.

The present invention also provides an arrangement of a vehicle engine start apparatus having an engine start switch. The engine start switch is located on a center cluster of an instrument panel. A recess is formed in the center cluster. A manipulation member operates the engine start switch. The manipulation member is attached to a mount surface that defines a part of the recess. The manipulation member does not project from the recess.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6(a) is a diagram showing a display and a manipulation member included in the first display device;

FIG. 6(b) is a diagram showing the display of FIG. 6(a) in a first display mode;

FIG. 6(c) is a diagram showing the display of FIG. 6(a) in a third display mode;

FIG. 6(d) is a diagram showing the display of FIG. 6(a) in a fifth display mode;

FIG. 6(e) is a diagram showing the display of FIG. 6(a) in the third display mode;

FIG. 6(f) is a diagram showing a display of FIG. 6(a) in a sixth display mode;

FIG. 6(g) is a diagram showing a display of FIG. 6(a) in a seventh display mode;

FIG. 6(h) is a diagram showing a display of FIG. 6(a) in an eighth display mode;

FIG. 6(i) is a diagram showing the display of FIG. 6(a) in the third display mode;

FIG. 7(a) is a diagram showing the display of FIG. 6(a) in a second display mode;

FIG. 7(b) is a diagram showing the display of FIG. 6(a) in a fourth display mode;

FIG. 7(c) is a diagram showing the display of FIG. 6(a) in a ninth display mode;

FIG. 7(d) is a diagram showing the display of FIG. 6(a) in a tenth display mode;

FIG. 14(a) is a diagram showing a display and a manipulation member, which are the same as those of FIG. 6(a);

FIG. 14(b) is a diagram showing the display in a first display mode according to a second embodiment;

FIG. 14(c) is a diagram showing the display in a third display mode according to the second embodiment;

FIG. 14(d) is a diagram showing the display in a fifth display mode according to the second embodiment;

FIG. 14(e) is a diagram showing the display in the third display mode according to the second embodiment;

FIG. 14(f) is a diagram showing the display in a sixth display mode according to the second embodiment;

FIG. 14(g) is a diagram showing the display in a seventh display mode according to the second embodiment;

FIG. 14(h) is a diagram showing the display in an eighth display mode according to the second embodiment;

FIG. 14(i) is a diagram showing the display in the third display mode according to the second embodiment;

FIG. 15(a) is a diagram showing the display in a second display mode according to the second embodiment;

FIG. 15(b) is a diagram showing the display in a fourth display mode according to the second embodiment;

FIG. 15(c) is a diagram showing the display in a ninth display mode according to the second embodiment;

FIG. 15(d) is a diagram showing the display in a tenth display mode according to the second embodiment;

FIG. 16(a) is a diagram showing a display and a manipulation member, which are the same as those of FIG. 6(a);

FIG. 16(b) is a diagram showing the display in a first display mode according to a third embodiment;

FIG. 16(c) is a diagram showing the display in a third display mode according to the third embodiment;

FIG. 16(d) is a diagram showing the display in an eleventh display mode according to the third embodiment;

FIG. 16(e) is a diagram showing the display in a fifth display mode according to the third embodiment;

FIG. 16(f) is a diagram showing the display in the third display mode according to the third embodiment;

FIG. 16(g) is a diagram showing the display in a sixth display mode according to the third embodiment;

FIG. 16(h) is a diagram showing the display in a seventh display mode according to the third embodiment;

FIG. 16(i) is a diagram showing the display in an eighth display mode according to the third embodiment;

FIG. 16(j) is a diagram showing the display in the third display mode according to the third embodiment;

FIG. 16(k) is a diagram showing the display in a twelfth display mode according to the third embodiment;

FIG. 17(a) is a diagram showing the display in a ninth display mode according to the third embodiment;

FIG. 17(b) is a diagram showing the display in a thirteenth display mode according to the third embodiment;

FIG. 17(c) is a diagram showing the display in a fourteenth display mode according to the third embodiment;

FIG. 17(d) is a diagram showing the display in a tenth display mode according to the third embodiment;

FIG. 26(a) is a diagram showing the display device of FIG. 24 in an eleventh display mode;

FIG. 26(b) is a diagram showing the display device of FIG. 24 in a fifth display mode;

FIG. 26(c) is a diagram showing the display device of FIG. 24 in a seventh display mode;

FIG. 26(d) is a diagram showing the display device of FIG. 24 in an eighth display mode;

FIG. 26(e) is a diagram showing a display device of a modification;

DETAILED DESCRIPTION OF THE PREFERRED EMBODIMENTS

A vehicle engine starting apparatus 1 according to a first embodiment of the present invention will be described with reference to FIGS. 1 to 13.

Figure 4:
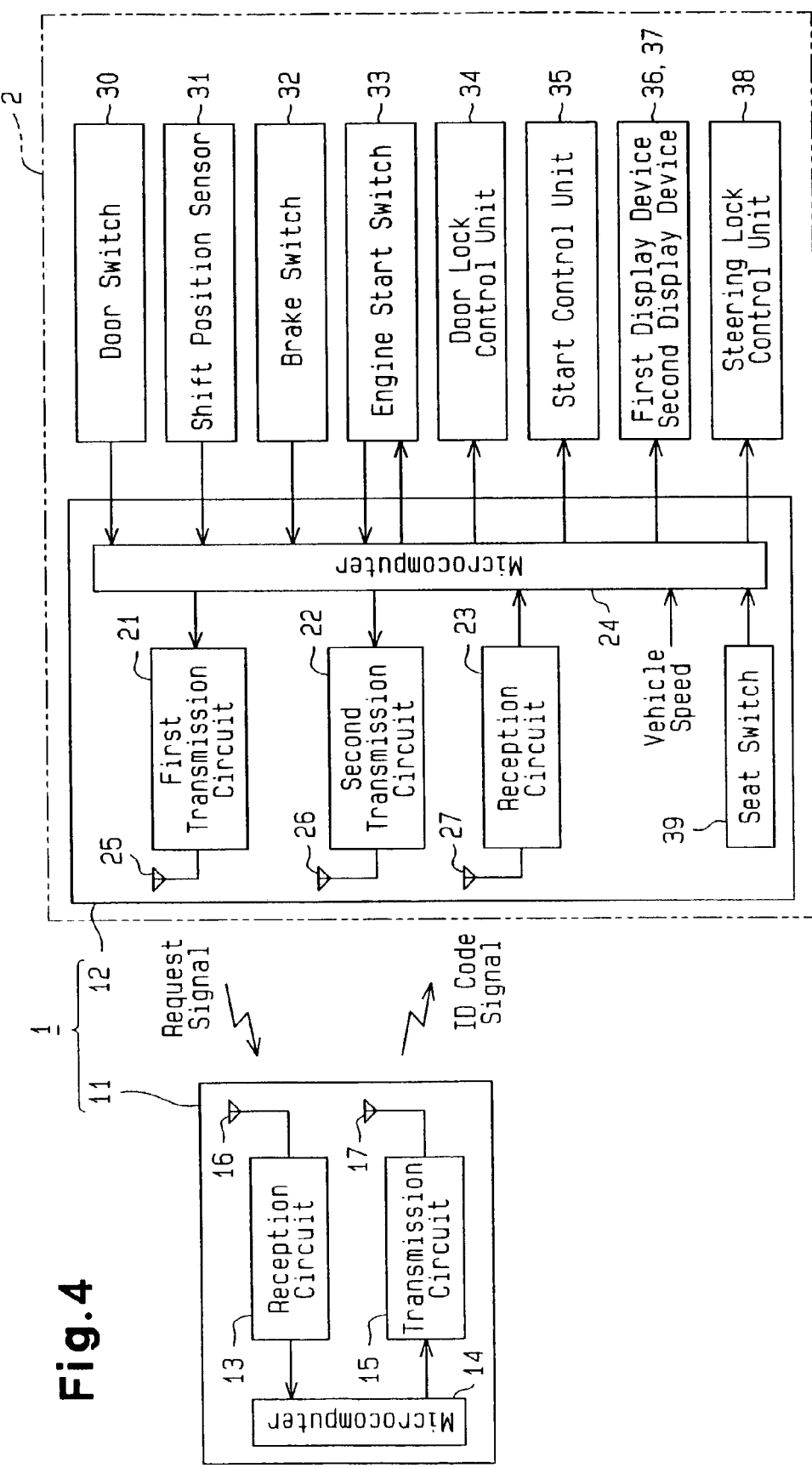
FIG. 4 is a block diagram showing the engine starting apparatus according to the first embodiment.

As shown in FIG. 4, the engine starting apparatus 1 includes a portable communication device 11 carried by an occupant (driver) of a vehicle 2, and a communication controller 12 mounted on the vehicle 2. The portable communication device 11 includes a reception circuit 13, a microcomputer 14, a transmission circuit 15.

The reception circuit 13 receives a request signal from the communication controller 12 and passes the request signal to the microcomputer 14. When receiving a request signal from the reception circuit 13, the microcomputer 14 outputs a transmission signal (ID code signal) containing a predetermined ID code. The transmission circuit 15 modulates the ID code signal to radio waves having a predetermined frequency and transmits the radio waves to the outside. The reception circuit 13 and the transmission circuit 15 are connected to an antenna 16, 17, respectively.

The communication controller 12 includes a first transmission circuit 21, a second transmission circuit 22, a reception circuit 23, and a microcomputer 24. The microcomputer 24 is connected to a door switch 30, a shift position sensor 31, a brake switch 32, a door lock control unit 34, a start control unit 35, a first display device 36, a second display device 37, a steering lock control unit 38, and a seat switch 39. The microcomputer 24 receives a vehicle speed signal from a vehicle speed sensor (not shown), which detects a vehicle speed.

The door switch 30 detects whether the door at the driver's seat is opened or closed. As the door is opened and closed, the door switch 30 sends an ON signal and OFF signal to the microcomputer 24, respectively.

The shift position sensor 31 detects the shift position of the transmission. The brake switch 32 is activated when the brake pedal is depressed and outputs a brake ON signal. When the brake pedal is not depressed, the brake switch 32 outputs a brake OFF signal. The brake switch 32 sends a switching signal, which is either the brake ON signal or the brake OFF signal, to the microcomputer 24. The seat switch 39 is located in a driver's seat 52 shown in FIG. 1 to detect whether a driver is seated on the driver's seat 52. When the driver is seated on the driver's seat 52, the seat switch 39 sends a seat ON signal to the microcomputer 24.

The transmission circuits 21, 22, and the reception circuit 23 are each connected to an antenna 25 to 27, respectively. The first transmission circuit 21 receives a first request signal from the microcomputer 24. The first transmission circuit 21 then converts the signal into radio waves or a magnetic signal and outputs the converted signal into a predetermined area outside the vehicle through the antenna 25. The second transmission circuit 22 receives a second request signal from the microcomputer 24. The second transmission circuit 22 then converts the signal into radio waves or a magnetic signal and outputs the converted signal into a predetermined area outside the passenger compartment through the antenna 26. Within the output areas of the request signals, the portable communication device 11 and the communication controller 12 establish a mutual communication.

The reception circuit 23 receives the ID code signal from the portable communication device 11 with the antenna 27. The reception circuit 23 then demodulates the ID code signal into a pulse signal, thereby generating a reception signal. The reception circuit 23 sends the reception signal to the microcomputer 24.

The microcomputer 24 is a control unit including a CPU, a ROM, and a RAM (none which is illustrated). The microcomputer 24 intermittently outputs the first or second request signal. The microcomputer 24 stores a predetermined ID code. When receiving the reception signal, the microcomputer 24 compares the stored ID code and the ID code contained in the reception signal. When the ID codes match and, the ID code is included in the ID code signal that is outputted in response to the first request signal, the microcomputer 24 determines that the user carries a portable communication device 11 having a valid key ID. In this case, the microcomputer 24 activates the door lock control unit 34 to unlock the door. If the microcomputer 24 stops receiving the first request signal, the microcomputer 24 activates the door lock control unit 34 to lock the door.

The microcomputer 24 is capable of verifying two or more ID code signals against two or more ID code signals stored in the microcomputer 24. In other words, the microcomputer 24 is capable of acknowledging two or more valid key IDs. That is, the microcomputer 24 identifies two or more users each carrying a portable communication device having a valid ID code.

When the ID code signal in the first request signal matches with the ID code signal transmitted by the portable communication device 11, the microcomputer 24 acknowledges that an outside verification is established.

The engine starting apparatus 1 functions as a remote keyless entry apparatus.

If the matched ID code is contained in an ID code signal transmitted in response to the second request signal, the microcomputer 24 sets the start control unit 35 in a standby state for starting the engine.

When the ID code signal in the second request signal matches with the ID code signal transmitted by the portable communication device 11, the microcomputer 24 acknowledges that an inside verification is established.

The engine starting apparatus 1 functions as a keyless ignition apparatus. When the start control unit 35 is in the engine start standby state, the microcomputer 24 starts the engine by activating the start control unit 35 if a predetermined manipulation is performed under predetermined conditions.

An engine start switch 33 is located in a center cluster 51 of an instrument panel 50.

The engine start switch 33 is a momentary push switch. That is, the engine start switch 33 is turned on only when it is held pressed. When turned on, the engine start switch 33 sends an ON signal to the microcomputer 24.

Figure 5:
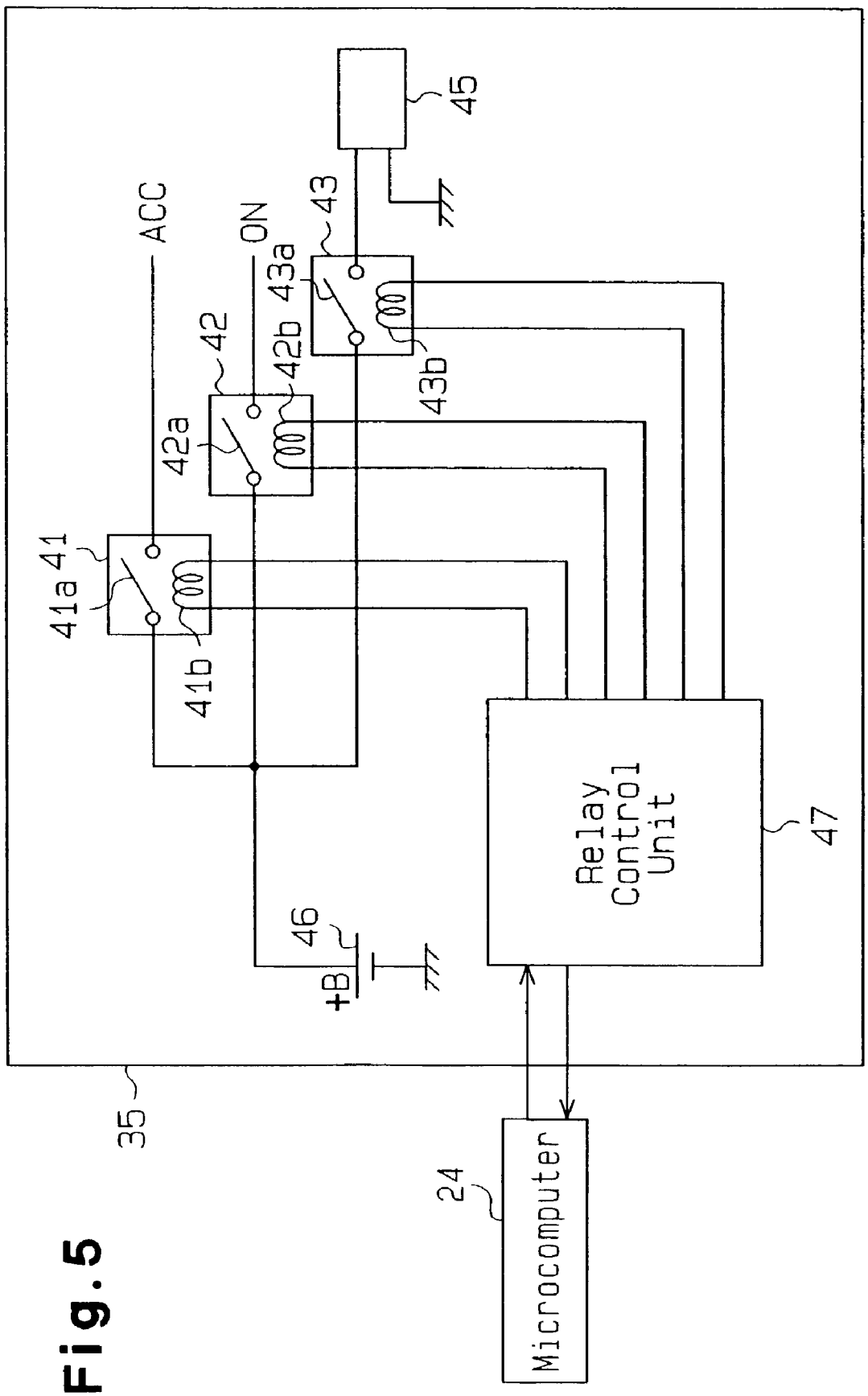
FIG. 5 is a circuit diagram showing an engine start control unit included in the engine starting apparatus shown in FIG. 4.

As shown in FIG. 5, the start control unit 35 includes a relay control unit 47, an accessory (ACC) relay 41, an IG relay 42, and a starter relay 43.

A first end of a contact 41a of the ACC relay 41 is connected to an electrical circuit of an ACC system. A second end of the contact 41a is connected to a battery 46. The electrical circuit of the ACC system includes, for example, headlights, fog lamps, a car audio system.

A first end of a contact 42a of the IG relay 42 is connected to an electrical circuit of an ignition system. A second end of the contact 42a is connected to the battery 46. A first end of a contact 43a of the starter relay 43 is connected to a starter motor 45 for cranking the engine. A second end of the contact 43a is connected to the battery 46.

Actuation coils 41b, 42b, 43b for opening and closing the contacts 41a to 43a of the relays 41 to 43 are connected to the relay control unit 47. The relay control unit 47 controls currents supplied to the actuation coils 41b to 43b.

The relay control unit 47 receives various control signals from the microcomputer 24 of the communication controller 12. Based on the received signals, the relay control unit 47 supplies current to the actuation coils 41b to 43b of the relays 41 to 43. When the signals are stopped, the relay control unit 47 stops supplying current to the actuation coils 41b to 43b.

The configuration about the engine start switch 33 will now be described with reference to FIGS. 1 to 3.

Figure 1:
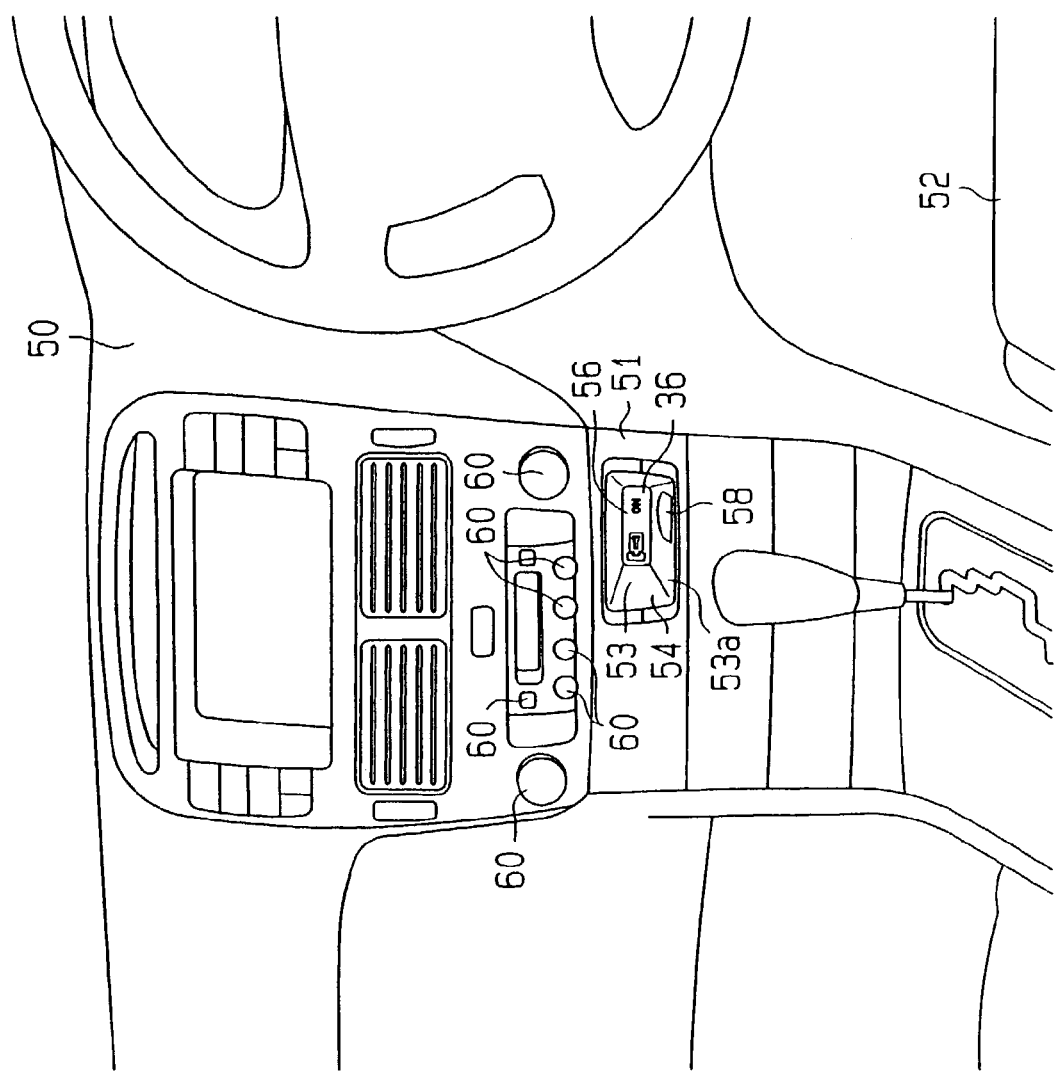
FIG. 1 is a schematic view illustrating the interior of a vehicle equipped with a vehicle engine starting apparatus having a first display device according to a first embodiment of the present invention.
Figure 2:
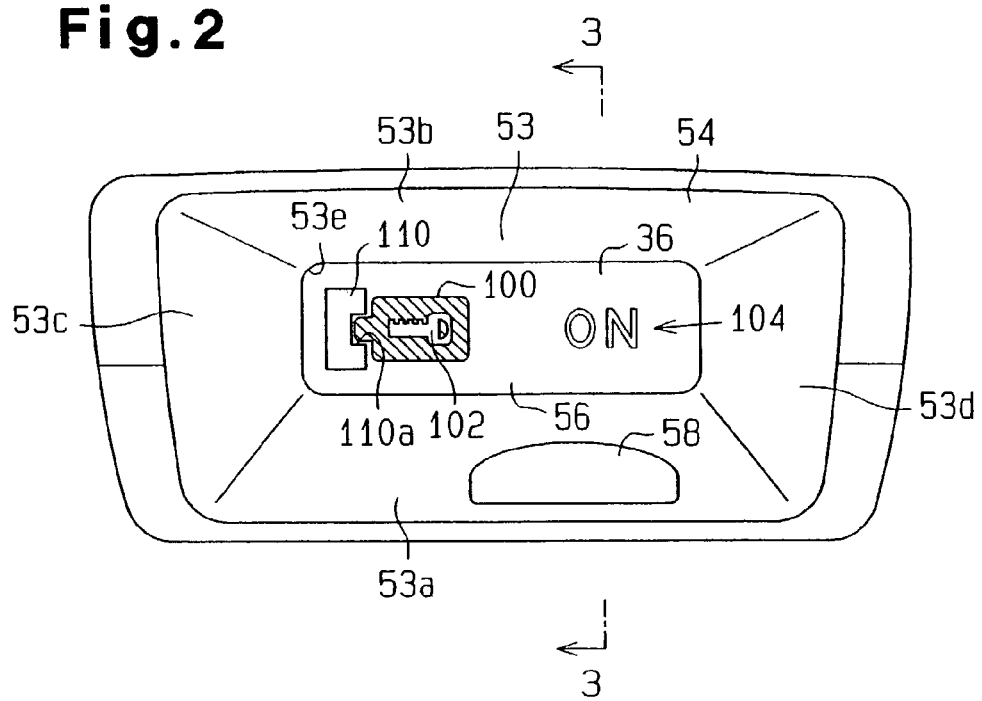
FIG. 2 is a front view illustrating the first display device of FIG. 1.

As shown in FIG. 1, the center cluster 51 of the instrument panel 50 is located relatively close to the driver's seat and has a recess 53. The recess 53 has a substantially rectangular opening 54. As shown in FIG. 2, the cross-sectional area of the recess 53, which is rectangular, decreases toward the bottom. The recess 53 opens rearward in relation to the traveling direction of the vehicle. Dimensions of the recess 53 along the lateral and vertical direction of the vehicle decrease frontward in relation to the traveling direction of the vehicle. A mount surface, which is a lower wall 53a of the recess 53, is a flat surface that inclines upward toward the bottom of the recess 53. An upper wall 53b of the recess 53 is a flat surface that is inclined downward toward the bottom of the recess 53. Sidewalls 53c, 53d of the recess 53 are flat surfaces that approach each other toward the bottom of the recess 53.

In this embodiment, the vehicle is a car with a right-hand steering wheel. The side of the driver's seat 52 is referred to as a right side, the side of the front passenger seat is referred to as a left side, the side corresponding to the forward direction of the vehicle is referred to as a front side, and the side corresponding to the rearward direction of the vehicle is referred to as a rear side.

The first display device 36 is located on a bottom opening 53e of the recess 53. The first display device 36 is a display unit and has a display 56. In this embodiment, the display 56 is a color liquid crystal display. The first display device 36 is visible from the outside of the vehicle.

Figure 3:
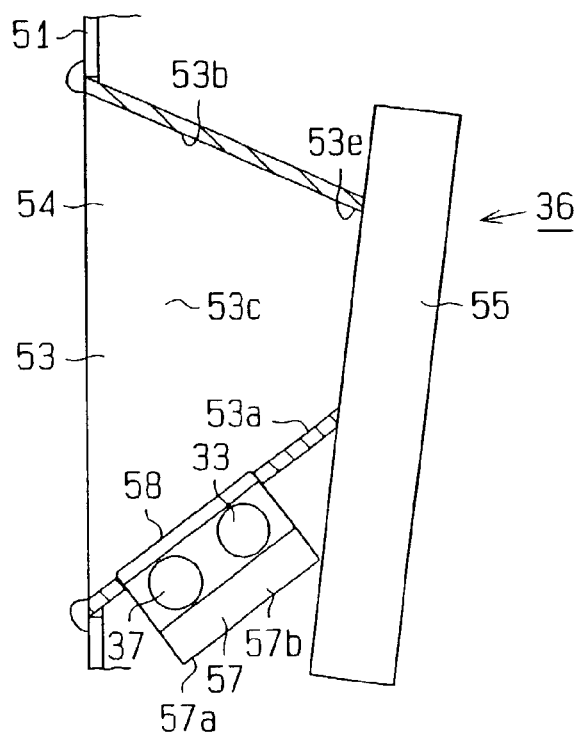
FIG. 3 is a cross-sectional view taken along line 3—3 of FIG. 2.

As shown in FIG. 3, a switch unit 57 is provided on the lower wall 53a of the recess 53. The switch unit 57 includes a manipulation member 58, the engine start switch 33, and the second display device 37.

The engine start switch 33 is fixed to a board 57b provided in a housing 57a of the switch unit 57. The manipulation member 58 is located in an upper opening of the housing 57a and is moved when pushed. The manipulation member 58 does not project from the recess 53. Specifically, the manipulation member 58 extends along the lower wall 53a. The manipulation member 58 is pressed, for example, by a finger of a driver inserted into the recess 53. In response to pressing of the manipulation member 58, the engine start switch 33 is selectively turned on and off. The manipulation member 58 may be located on the upper wall 53b of the recess 53.

The manipulation member 58 is made of a translucent synthetic resin. The second display device 37 is located in the housing 57a and includes light emitting diodes. When emitting light, the second display device 37 is visible to the driver through the operational member 58.

As shown in FIG. 1, in the center cluster 51, audio devices such as a car radio, a CD player, and an MD player, are located above the recess 53. Audio switches 60 for controlling the audio devices are provided above the recess 53.

The operation of the engine starting apparatus 1 will now be described.

Before the engine starting apparatus 1 is activated, the vehicle doors are locked by the door lock control unit 34, and the steering wheel is locked by the steering lock control unit 38. As shown in FIG. 6(a), the first display device 36 displays nothing, and the second display device 37 does not emit light.

FIGS. 8 to 13 are flowcharts showing a control program executed by the microcomputer 24 of the engine starting apparatus 1. The microcomputer 24 of the engine starting apparatus 1 starts the control program when starting communication with a portable communication device 11.

FIGS. 6(a) to 6(i) are diagrams showing changes of the first display device 36 and the second display device 37. For purposes of illustration, only the states of the second display device 37 are shown in FIGS. 6(a) to 6(i), and 7(d). Cross-hatching of the manipulation member 58 represents a state in which the second display device 37 is not emitting light. The manipulation member 58 illustrated without cross-hatching represents a state in which the second display device 37 is emitting light. In other embodiments, hatching and no hatching on the manipulation member 58 represent the same states.

Figure 8:
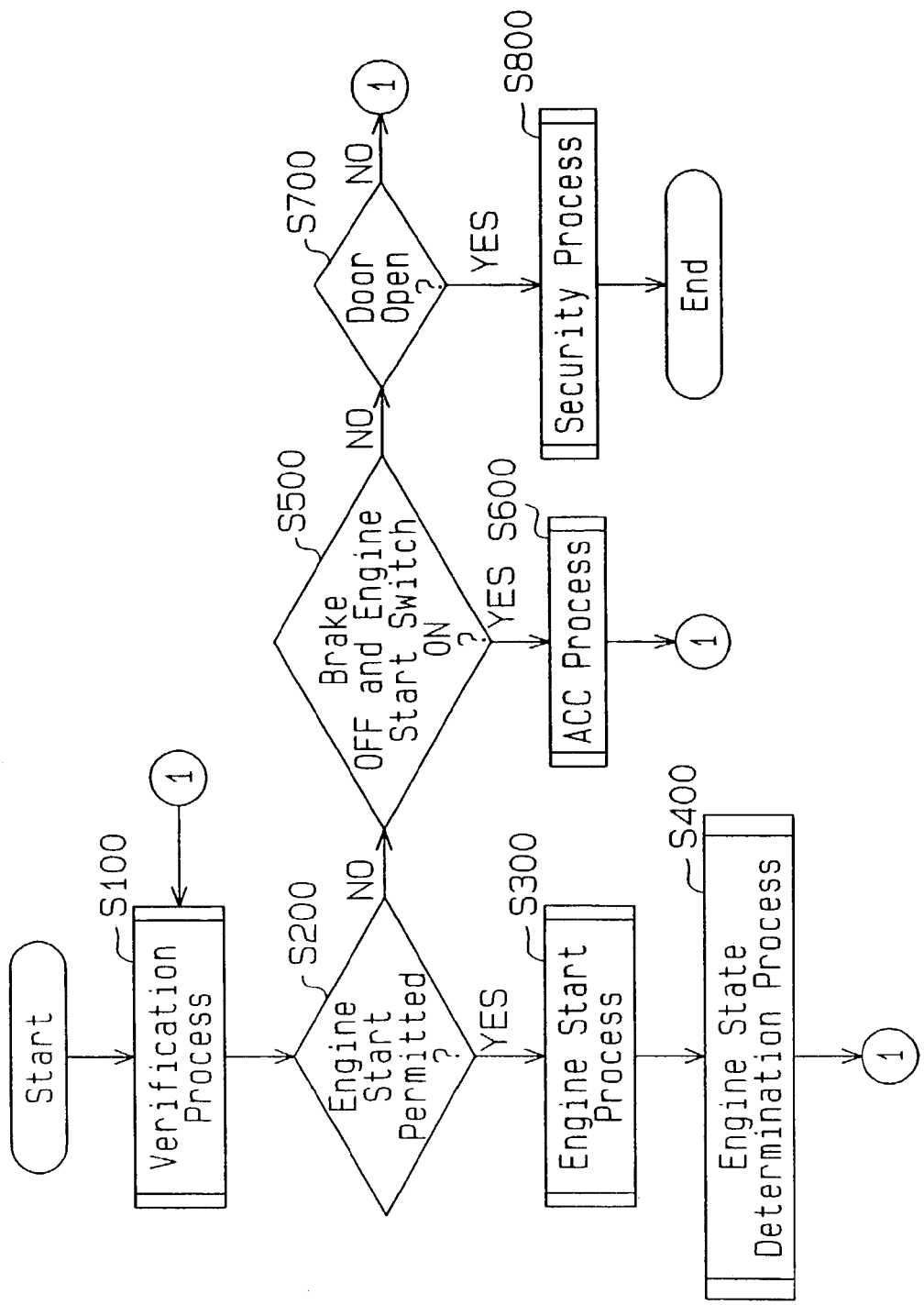
FIG. 8 is a flowchart showing a control program according to the first embodiment.

FIG. 8 is a diagrammatic flowchart of the control program.

When the control program is started, the microcomputer 24 performs a verification process in step S100. Thereafter, the microcomputer 24 proceeds to step S200. In step S200, the microcomputer 24 receives signals from the shift position sensor 31 and the brake switch 32, and determines whether the engine is permitted to be started.

Specifically, in step S200, the microcomputer 24 determines that the engine is permitted to be started if the brake switch 32 is ON and the signal from the shift position sensor 31 indicates that the transmission is in the P position or N position. If the outcome of step S200 is positive, the microcomputer 24 proceeds to step S300. In step S300, the microcomputer 24 performs an engine start process, and then proceeds to step S400. In step S400, the microcomputer 24 performs an engine state determination process and returns to the verification process of step S100.

If the outcome of step S200 is negative, that is, if the starting of the engine is not permitted, the microcomputer 24 proceeds to step S500. In step S500, the microcomputer 24 determines whether it has received a brake OFF signal and an ON signal from the engine start switch 33. If the outcome of step S500 is positive, that is, if a brake OFF signal has been inputted and an ON signal has been inputted from the engine start switch 33, the microcomputer 24 proceeds to step S600. In step S600, the microcomputer 24 performs an accessory (ACC) process and returns to the verification process of step S100.

If the outcome of step S500 is negative, that is, if at least one of a brake OFF signal and an ON signal from the engine start switch 33 has not been inputted, the microcomputer 24 proceeds to step S700. In step S700, the microcomputer 24 determines whether it has received an ON signal from the door switch 30, that is, if the door has been opened. If the outcome of step S700 is positive, that is, if an ON signal has been inputted from the door switch 30, the microcomputer 24 proceeds to step S800. In step S800, the microcomputer 24 performs a security process, and then terminates the control flowchart. If the outcome of step S700 is negative, on the other hand, that is, if an OFF signal is inputted from the door switch 30, the microcomputer 24 determines that the door is closed and returns to the verification process of step S100.

Each process routine will now be described.

1. Verification Process Routine.

Step S100 of FIG. 8 is a verification process routine and will now be described with reference to FIG. 9.

Based on the ID code signal from the portable communication device 11, the microcomputer 24 determines whether the outside verification has been established. If the outcome of step S110 is negative, that is, if the outside verification has not been established, the microcomputer 24 terminates the control program. If the outcome of step S110 is positive, that is, if the outside verification has been established, the microcomputer 24 proceeds to step S120.

If the door is locked in step S120, the microcomputer 24 activates the door lock control unit 34 to unlock the door. If the door is not locked, the microcomputer 24 proceeds to step S130.

Then, based on the verification result of step S110, the microcomputer 24 outputs a display control signal to the first display device 36, thereby causing the first display device 36 to show a first display mode or a second display mode.

The first display mode indicates that the microcomputer 24 has verified the ID code signal of a single portable communication device 11 against an ID code signal stored in the microcomputer 24 and, as a result, acknowledges that the communication device 11 has a valid key ID.

When the first display mode of FIG. 6(b) is shown, a key frame icon 100 appears on the display 56 of the first display device 36. A key number 101, which represents the number of a valid key, appears in the key frame icon 100. The key frame icon 100 has a projection 100a representing an insertion portion of the key.

In the first display mode, a key hole icon 110 is shown on the display 56 at a position away from the key frame icon 100. The key hole icon 110 has an engagement recess 110a at a position corresponding to the projection 100a of the key frame icon 100. The size of the recess 110a is sufficient for receiving the projection 100a.

The key frame icon 100 corresponds to a first display image having a predetermined shape. The key hole icon 110 corresponds to a second display image.

The second display mode indicates that the microcomputer 24 has verified the ID code signals of two or more portable communication devices 11 against ID code signals stored in the microcomputer 24 and, as a result, acknowledges the communication devices 11 each having a valid key ID. In this embodiment, the number of the valid key IDs is two, and the second display mode shows all the key IDs.

The second display mode of FIG. 7(a) shows a plurality of key frame icons 100. Each of the key frame icons 100 has a number representing the corresponding communication device 11 having an acknowledged valid key ID. FIG. 7(a) shows an example in which two valid key IDs are acknowledged. That is, in FIG. 7(a), in addition to the key frame icon 100 on the first display mode of FIG. 6(b), another key frame icon 100 with a key number 101 is shown. The key number represents a second valid key ID.

When acknowledging two or more valid key IDs, the microcomputer 24 determines that the one with a greater level of reception signal is valid and invalidates the other key IDs. Among the ID code signals transmitted from two or more portable communication devices 11 to the microcomputer 24, the ID code signal from the portable communication device 11 that is closest to the microcomputer 24 has the greatest reception level. Based on the determination, the microcomputer 24 shows the key frame icon 100 of the valid key ID with a solid line, and the key frame icon 100 of the invalid key ID with a broken line in the second display mode.

In step S140, the microcomputer 24 determines whether the door has been opened based on a signal from the door switch 30. If the outcome of step S140 is positive, that is, if an ON signal has been inputted from the door switch 30, the microcomputer 24 determines that the door has been opened and proceeds to step S150. If the outcome of step S140 is negative, that is, if an ON signal from the door switch 30 is not inputted, the microcomputer 24 returns to step S110.

In step S150, the microcomputer 24 activates the accessories (ACC). That is, the microcomputer 24 outputs an ACC activation signal to the relay control unit 47. Based on the ACC activation signal, the relay control unit 47 supplies an excitation current to the actuation coil 41b of the ACC relay 41.

In step S160, the microcomputer 24 determines whether the inside verification has been established. If the outcome of step S160 is negative, that is, if the inside verification has not been established, the microcomputer 24 proceeds to step S180. If the outcome of step S160 is positive, that is, if the inside verification has been established, the microcomputer 24 proceeds to step S170.

In step S170, the microcomputer 24 outputs a control signal to the second display device 37 to cause the second display device 37 to continuously emit light (a third display mode). This permits occupants to visually identify the lighting state of the operational member 58. Hereinafter, when necessary, a state in which the second display device 37 is continuously emitting light will be referred to that the manipulation member 58 is continuously emitting light.

The continuous lighting of the second display device 37 indicates that the communication device 11 having a valid key ID has been acknowledged as a result of the inside verification.

Further, the microcomputer 24 outputs a display control signal to the first display device 36 to cause the first display device 36 to show the third display mode. Thereafter, the microcomputer 24 terminates the step. In the subsequent steps, also, the microcomputer 24 sends a control signal for continuously emitting light from the second display device 37 to the second display device 37 when showing the third display.

The third display mode is the same as the first display mode of FIG. 6(b) except for the following points.

As shown in FIG. 6(c), instead of the key number 101, a key symbol 102, which resembles an actual key more than the key frame icon 100 does, is shown in the key frame icon 100. Further, an character ACC 103 is shown on a region of the display 56 corresponding to the manipulation member 58.

The character ACC 103 and the continuous lighting of the manipulation member 58 represent that the engine start switch 33 is enabled and can be manipulated with the manipulation member 58.

The character ACC 103 and the continuous lighting of the manipulation member 58 clearly show the location of the manipulation member 58.

In step S180, the microcomputer 24 outputs a display control signal to the first display device 36. After causing the first display unit 36 to show a fourth display mode of FIG. 7(b), the microcomputer 24 proceeds to step S190.

The fourth display mode is the same as the third display mode of FIG. 6(c) except for the following points. In the fourth display mode, the character ACC 103 is not shown, and the key frame icon 100 is shown by a broken line.

In step S190, the microcomputer 24 performs other processes. Since these other processes are not related to the present invention, the descriptions are omitted.

2. Engine Start Process Routine

Step S300 of FIG. 8, which is the engine start process routine, will now be described with reference to FIG. 10.

Figure 10:
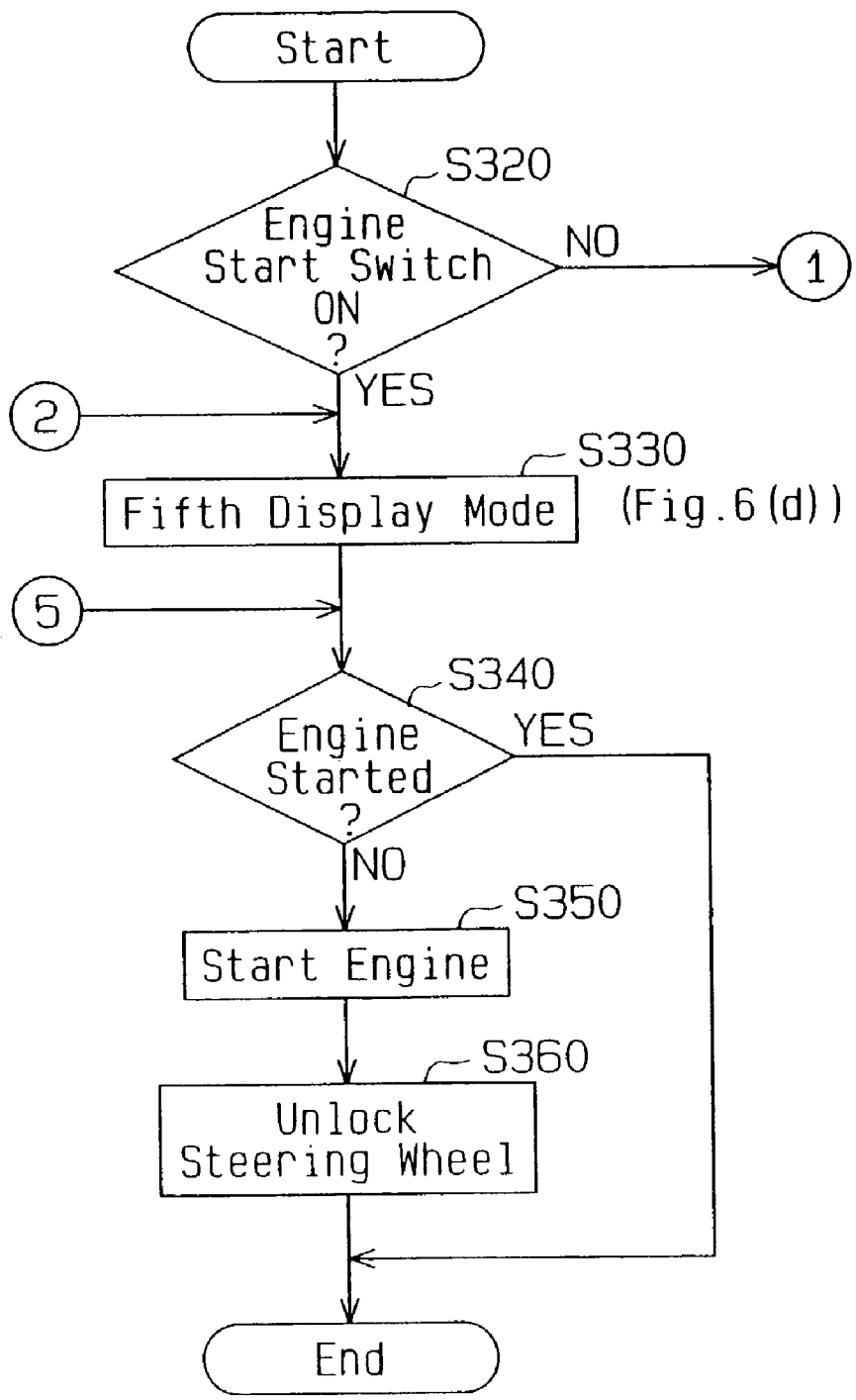
FIG. 10 is a flowchart showing an engine start process in FIG. 8.

In step S320 of FIG. 10, the microcomputer 24 determines whether the engine start switch 33 has been pressed and whether the microcomputer 24 has received an ON signal.

Figure 9:
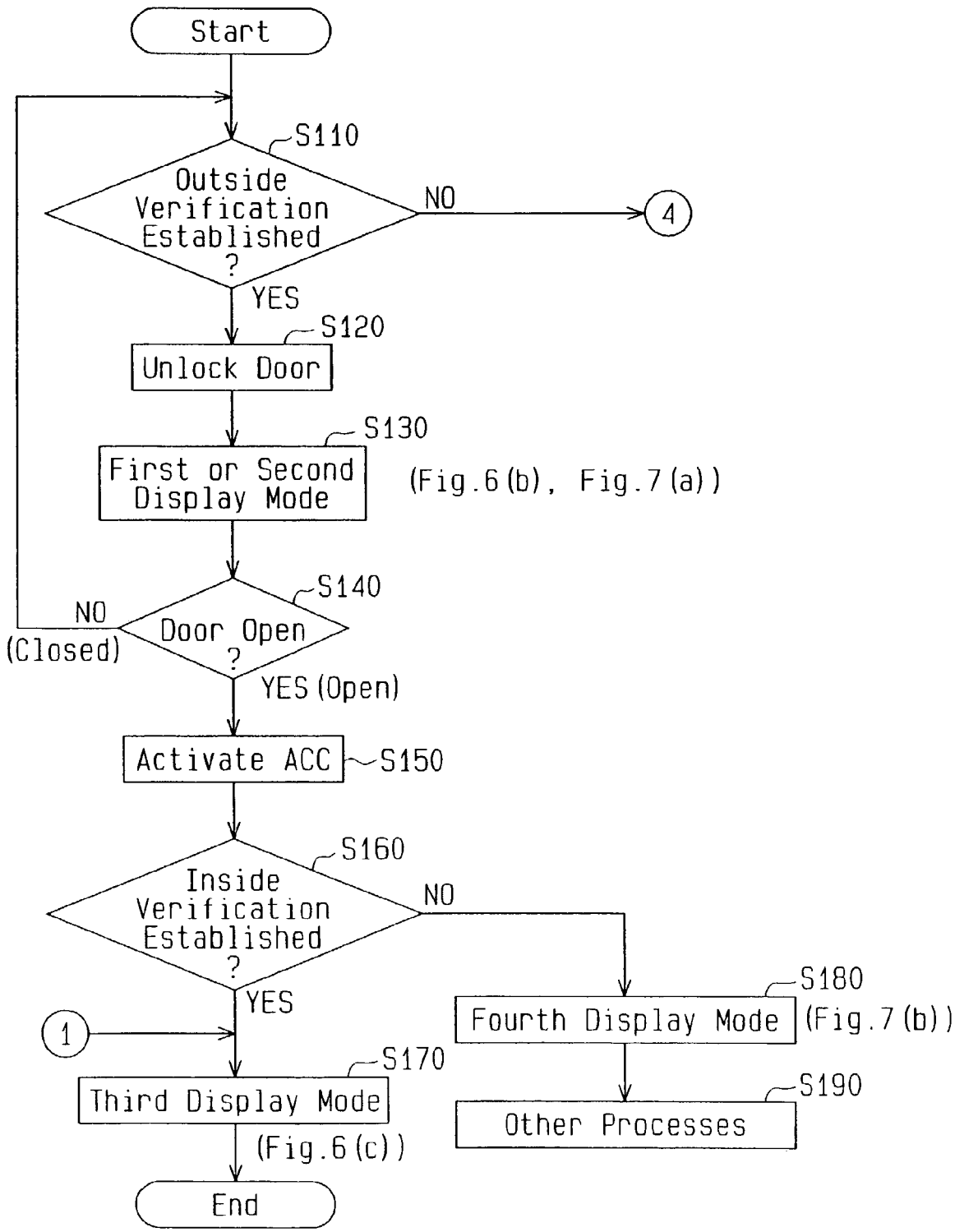
FIG. 9 is a flowchart showing a verification process in FIG. 8.

If the outcome of step S320 is negative, that is, if no ON signal has been inputted, the microcomputer 24 returns to step S170 shown in FIG. 9. If the outcome of step S320 is positive, that is, if an ON signal has been inputted, the microcomputer 24 proceeds to step S330.

In step S330, the microcomputer 24 outputs a display control signal to the first display device 36. The microcomputer 24 causes the first display device 36 to show a fifth display mode shown in FIG. 6(*d*).

The fifth display mode is the same as the third display mode of FIG. 6(*c*) except for the following points.

As shown in FIG. 6(*d*), a character ON 104 is shown instead of the character ACC 103. Further, in the fifth display mode, the projection 100*a* of the key frame icon 100 is engaged with the recess 110*a*. Also, the region between the key symbol 102 and the key frame icon 100 is highlighted in a color that is different from that of the third display mode. In FIG. 6(*d*), the region of the cross-hatching indicates that the region is shown in a color different from that of the third display mode.

Highlighting in a color that is different from that of the third display mode of FIG. 6(*c*) notifies the driver that the engine has been started and running.

When the fifth display mode is shown, the second display device 37 continues receiving a control signal for continuous lighting from the microcomputer 24.

In step S340, the microcomputer 24 determines whether the engine has already been started. If the outcome of step S340 is negative, that is, if the engine has not been started, the microcomputer 24 proceeds to step S350. If the outcome of step S340 is positive, that is, if the engine has already been started, the microcomputer 24 terminates the engine start process routine.

In step S350, the microcomputer 24 outputs a control signal for starting the engine to the relay control unit 47 of the start control unit 35. Based on the control signal, the relay control unit 47 supplies current to the actuation coils 41*b* to 43*b* of the relays 41 to 43. When the starting of the engine is completed, the relay control unit 47 stops the current to the starter relay 43.

In step S360, the microcomputer 24 outputs a control signal to the steering lock control unit 38, thereby unlocking the steering wheel. Then, the microcomputer 24 terminates the engine start process routine. After the steering wheel is unlocked, the steering wheel can be manipulated.

3. Engine State Determination Process Routine

Step S400 of FIG. 8, which is the engine state determination process routine, will now be described with reference to FIG. 11.

In step S410, the microcomputer 24 determines whether the engine start switch 33 is pressed and whether the microcomputer 24 has received an ON signal.

If the outcome of step S410 is negative, that is, if an ON signal has not been inputted, the microcomputer 24 proceeds to step S450. If the outcome of step S410 is positive, that is, if an ON signal has been inputted, the microcomputer 24 proceeds to step S420.

In step S420, the microcomputer 24 judges whether the vehicle speed is zero based on a vehicle speed signal. If the outcome of step S420 is negative, that is, if the vehicle speed is not zero, the microcomputer 24 proceeds to step S470. If the outcome of step S420 is positive, that is, if the vehicle speed is zero, the microcomputer 24 proceeds to step S430.

In step S430, the microcomputer 24 judges whether the brake switch 32 is ON. If the outcome of step S430 is positive, that is, if the brake switch 32 is ON, the microcomputer 24 proceeds to step S440. If the outcome of step S430 is negative, that is, if the brake switch 32 is OFF, the microcomputer 24 returns to step S410.

Since the engine start switch 33 is ON in step S410, the vehicle speed is zero in step S420, and the brake switch 32 is ON in step S430, engine stop conditions are satisfied. In this case, the microcomputer 24 executes a control for stopping the engine in step S440 and terminates the routine.

Specifically, the microcomputer 24 stops sending control signals for controlling the IG relay to the relay control unit 47. Based on the stop of the control signal, the relay control unit 47 stops sending excitation current to the actuation coil 42*b*. As a result, the IG relay 42 is turned off and the engine is stopped.

After step S440, the microcomputer 24 proceeds to step S170 (see FIG. 9) of the verification process routine. Therefore, the display 56 is changed from the fifth display mode (see FIG. 6(*d*)) to the third display mode (see FIGS. 6(*c*) and 6(*e*)).

If the microcomputer 24 proceeds to step S450 from step S410, the engine start switch 33 has not been operated.

In step S450, the microcomputer 24 determines whether the inside verification has been established. If the outcome of step S450 is negative, that is, if the inside verification has not been established, the microcomputer 24 proceeds to step S460. If the outcome of step S450 is positive, that is, if the inside verification has been established, the microcomputer 24 returns to step S330 of FIG. 10. In this case, since the inside verification has been established, the fifth display mode (see FIG. 6(*d*)) continues showing.

In step S460, since the inside verification has not been established, the microcomputer 24 shows a ninth display mode and proceeds to step S340 of FIG. 10, which is the engine start process routine.

As shown in FIG. 7(*c*), the ninth display mode is different from the fifth display mode of FIG. 6(*d*) in that the frame of the key frame icon 100 is shown with a broken line. In this case, even if the inside verification is not established, the microcomputer 24 does not stop the engine.

The ninth display mode represents a case in which the portable communication device 11 cannot transmit the ID code to the communication controller 12 due to, for example, a low battery level.

In step 470, the microcomputer 24 outputs a display control signal to the first display device 36, thereby causing the first display device 36 to show a tenth display mode.

The tenth display mode is the same as the fifth display mode of FIG. 6(*d*) except for the following point.

As shown in FIG. 7(*d*), a sandglass symbol 107 is shown instead of the character ON 104.

Then, the microcomputer 24 outputs a control signal to the second display device 37 to turn off the second display device 37, thereby notifying occupants that the manipulation member 58 does not function as the engine start switch 33 even if manipulated. Instead of turning off the second display device 37, the second display device 37 may be blinked.

4. Accessory (ACC) Process Routine

Step S600 of FIG. 8, which is the ACC procedure routine, will now be described with reference to FIG. 12.

The ACC process routine is performed when a brake OFF signal is inputted and an ON signal is inputted from the engine start switch 33. In step S610, the microcomputer 24 outputs a display control signal to the first display device 36. The microcomputer 24 causes the first display device 36 to show a seventh display mode shown in FIG. 6(g).

The seventh display mode is the same as the third display mode of FIG. 6(c) except for the following point.

As shown in FIG. 6(g), a character OFF 105 is shown instead of the character ACC 103. When the seventh display mode is shown, the second display device 37 continues receiving a control signal for continuously lighting from the microcomputer 24.

As described above, the microcomputer 24 activates the first display device 36 and the second display device 37, and stops sending control signals from the ACC relay 41 to the relay control unit 47. Based on the stop of the control signal, the relay control unit 47 stops excitation current to the actuation coil 41b. As a result, the ACC relay 41 is turned OFF and the current to the ACC system is stopped.

In step S620, the microcomputer 24 determines whether the engine start switch 33 is pressed and whether the microcomputer 24 has received an ON signal.

If the outcome of step S620 is negative, that is, if an ON signal has not been inputted, the microcomputer 24 returns to step S610. If the outcome of step S620 is positive, that is, if an ON signal has been inputted, the microcomputer 24 proceeds to step S630.

In step S630, the microcomputer 24 outputs a display control signal to the first display device 36. The microcomputer 24 causes the first display device 36 to show an eighth display mode shown in FIG. 6(h).

The eighth display mode is the same as the seventh display mode of FIG. 6(g) except for the following point.

As shown in FIG. 6(h), a character ON 104 is shown instead of the character OFF 105.

When the eighth display mode is shown, the second display device 37 continues receiving a control signal for continuously lighting from the microcomputer 24.

In step S620, the microcomputer 24 activates the accessories (ACC). That is, the microcomputer 24 outputs an ACC activation signal to the relay control unit 47. Based on the ACC activation control signal, the relay control unit 47 supplies an excitation current to the actuation coil 41b of the ACC relay 41. Thereafter, the microcomputer 24 proceeds to step S640.

In step S640, the microcomputer 24 determines whether the engine start switch 33 has received an ON signal from the engine start switch 33.

If the outcome of step S640 is negative, that is, if an ON signal has not been inputted into the microcomputer 24, the microcomputer 24 returns to step S630. If the outcome of step S640 is positive, that is, if no ON signal has been inputted into the microcomputer 24, the microcomputer 24 returns to step S170 shown in FIG. 9.

In the procedure after step S170, the display 56 is changed from the eighth display mode of FIG. 6(h) to the third display mode (FIGS. 6(c) and 6(i)).

5. Security Process Routine

Step S800 of FIG. 8, which is the security process routine, will now be described with reference to FIG. 13.

In step S700 of FIG. 8, the microcomputer 24 determines whether an ON signal from the door switch 30 has been inputted, that is, if the door is open. In step S810, the microcomputer 24 outputs a control signal to the steering lock control unit 38, thereby locking the steering wheel. Then, the microcomputer 24 proceeds to step S820. If the steering wheel has already been locked, the microcomputer 24 proceeds to step S820 without executing step S810.

In step S820, the microcomputer 24 determines whether the door has been closed based on an OFF signal from the door switch 30. If the outcome of step S820 is positive, that is, if an OFF signal has been inputted into the microcomputer 24 from the door switch 30, the microcomputer 24 determines that the door is closed and proceeds to step S830. If the outcome of step S820 is negative, that is, if an OFF signal from the door switch 30 is not inputted into the microcomputer 24, the microcomputer 24 returns to step S170 of FIG. 9.

When determining that the door is open in step S820, the microcomputer 24 proceeds to step S170 of FIG. 9. Accordingly, the display 56 continues showing the third display mode (see FIGS. 6(c) and 6(e)).

In step S830, the microcomputer 24 outputs a display control signal to the first display device 36, thereby causing the first display device 36 to show the sixth display mode shown in FIG. 6(f). At this time, the microcomputer 24 outputs a control signal to the second display device 37 to turn off the second display device 37.

As shown in FIG. 6(f), the display 56 shows a character SECURITY 106 in the sixth display mode.

Further, the microcomputer 24 outputs a control signal to the door lock control unit 34 to lock the door. Thereafter, the microcomputer 24 causes the first display device 36 to turn off the character SECURITY 106 on the display 56 and stops controlling the first display device 36.

This embodiment provides the following advantages.

When a portable communication device 11 having a valid key ID is identified (acknowledged), the second display device 37 shows the location of the engine start switch 33. When no communication device 11 having a valid key ID is identified, the second display device 37 does not show the location of the engine start switch 33. Therefore, when the portable communication device 11 having a valid key ID is not identified, occupants are not encouraged to operate the engine start switch 33.

The microcomputer 24 causes the second display device 37 to display the acknowledgement of the portable communication device 11 having a valid key ID, thereby notifying occupants in the vehicle, such as a driver, of the completion of the acknowledgement of the portable communication device 11 having a valid key ID.

The engine starting apparatus 1 has the first display device 36, which shows the location of the engine start switch 33 in place of the second display device 37.

When a portable communication device 11 having a valid key ID is identified, the first display device 36 displays the character ACC 103 to show the location of the engine start switch 33. When a communication device 11 having a valid key ID is not identified, the first display device 36 does not show the location of the engine start switch 33. Therefore, when a portable communication device 11 having a valid key ID is not identified, occupants are not encouraged to operate the engine start switch 33.

Occupants are informed of the result of the acknowledgement by the character ACC 103 on the display 56 of the first display device 36. In other words, the occupants of the vehicle are notified of whether a portable communication device 11 having a valid key ID has been identified.

The second display device 37 emits light to show the result of acknowledgement of a portable communication device 11 having a valid key ID.

Therefore, the fact that a portable communication device 11 having a valid key ID has been identified is clearly shown to the occupants of the vehicle.

In accordance with the result of the acknowledgement of the portable communication device 11 having a valid key ID, the microcomputer 24 enables manipulation of the engine start switch 33. When manipulation of the engine start switch 33 is enabled, the second display device 37 displays the result of acknowledgement of the portable communication device 11 having a valid key ID. In other words, the microcomputer 24 causes the second display device 37 to show information indicating that a specific signal has been acknowledged.

When enabling manipulation of the engine start switch 33, the microcomputer 24 controls the second display device 37 to show that manipulation of the engine start switch 33 is enabled. That is, the microcomputer 24 causes the second display device 37 to appear differently when the engine start switch 33 is enabled from when the engine start switch is not enabled.

Before the engine start switch 33 is enabled, the second display device 37 does not show the result of acknowledgement of the communication device 11 having a valid key ID. Thus, an occupant (driver) is notified that manipulation of the engine start switch 33 is not enabled.

Since manipulation of the engine start switch 33 does not function before being enabled, the engine cannot be started if a portable communication 11 having a valid key ID has not been identified.

After the inside verification, the second display device 37 emits continuously light to show the final result of acknowledgement of a portable communication device 11 having a valid key ID.

When the outside verification is completed, the second display device 37 does not emit light. However, the outside verification is only preliminary and not a final acknowledgment. In this embodiment, the result of the inside verification is a final acknowledgement result.

The displaying state of the second display device 37 changes in accordance with specific conditions. Specifically, the displaying state of the second display device 37 is different when the engine start switch 33 is enabled, when the engine start switch 33 is enabled, and when the microcomputer 24 cannot acknowledge a portable communication device 11.

Specifically, when the engine start switch 33 is not manipulated, the second display device 37 is turned off as shown in FIGS. 6(a), 6(b), and 6(f). When the engine start switch 33 is enabled, the second display device 37 emits light as shown in FIGS. 6(c) to 6(e), and 6(g) to 6(i). When the microcomputer 24 cannot acknowledge a portable communication device 11, the second display device 37 is turned off or blinked as shown in FIG. 7(d).

Accordingly, occupants such as a driver are reliably informed of the state of the engine start switch 33.

In this embodiment, the microcomputer 24 causes the engine start switch 33 to function as a power switch of on-vehicle electrical devices based on reception of the brake OFF signal (switching signal). While the engine start switch 33 functions as a power switch, the first display device 36 shows the state of the engine start switch 33 (power switch), i.e. whether the power switch is ON or OFF.

Specifically, in the fifth display mode (see FIG. 6(d)) and the eighth display mode (see FIG. 6(h)), the character ON 104 is displayed. In the seventh display mode 6 (see FIG. 6(g)), the character OFF 105 is shown.

When the engine start switch 33 functions as a power switch, the ON/OFF state of the power switch (ON/OFF state of the ACC system) is informed to the occupant.

The microcomputer 24 is capable of acknowledging a plurality of portable communication devices 11 each having a valid key ID. For example, when the microcomputer 24 acknowledges a single portable communication device 11 having a valid key ID, the microcomputer 24 shows the first display mode (see FIG. 6(b)) on the first display device 36 to indicate which one of a plurality of portable communication devices 11 has been acknowledged.

Therefore, occupants such as a driver is reliably informed of the portable communication device 11 of which key ID has been acknowledged.

When simultaneously acknowledging two or more key IDs, the microcomputer 24 causes the first display device 36 to display all the acknowledged key IDs.

As a result, occupants such as a driver are informed of all the key IDs acknowledged by the microcomputer 24.

When simultaneously acknowledging two or more key IDs, the microcomputer 24 determines which one of the key IDs is to be enabled. Also, the microcomputer 24 shows the second display mode (see FIG. 7(a)) on the first display device 36 such that the valid key ID is distinguished from the other key IDs. That is, the microcomputer 24 causes the second display device 37 to appear differently when the engine start switch 33 is enabled from when the engine start switch is not enabled.

For example, when the result of acknowledgement of a valid key ID is used in controlling other systems, occupants are informed of the usage of the result.

Other systems include, for example, an automatic steering adjuster that stores data of each occupant and automatically controls a tilt steering wheel, and an automatic seat adjuster that automatically adjusts the positions of a seat and a lumbar support. These automatic adjusters relate key IDs to data for each occupant. When a key ID is acknowledged, the automatic adjusters control the associated devices according to the data of the occupant.

Therefore, if data for each occupant is registered in relation to a key ID by the systems listed above, occupants are informed whether automatic control based on the valid key ID is appropriate.

The result of the identification of a portable communication device 11 having a valid key ID in an outside verification is shown as the first display mode (see FIG. 6(b)). The result of the acknowledgement of a portable communication device 11 having a valid key ID in an inside verification is shown as the third display mode (see FIG. 6(c)). In other words, the results of the outside verification and the inside verification are shown in images different from each other.

Therefore, occupants are informed as to which of the outside verification and the inside verification has been established.

If the acknowledgement of a portable communication device 11 having a valid key ID cannot be performed after the acknowledgement is once established, the microcomputer 24 changes the fifth display mode showing the acknowledgement result (see FIG. 6(d)) to the ninth display mode (see FIG. 7(c)).

As a result, an occupant carrying the portable communication device 11 is informed that the inside verification between the portable communication device 11 and the communication controller 12 can no longer be performed. This informs the occupant of, for example, a dead battery.

The first display device 36 shows a first display image, which is the key frame icon 100, and a second display image, which is the key hole icon 110. The key hole icon 110 contacts the key frame icon 100. When the engine is not running, the microcomputer 24 shows the key frame icon 100 on the first display device 36. When the engine is running, the microcomputer 24 shows the key frame icon 100 and the key hole icon 110 on the first display device 36. Specifically, when the engine is not running, the key frame icon 100 is spaced from the key hole icon 110 (see FIG. 6(c)). When the engine is running, the key frame icon 100 contacts the key hole icon 110 (see FIG. 6(d)).

When the third display mode of FIG. 6(c) is changed to the fifth display mode of FIG. 6(d), the key frame icon 100, which is away from the key hole icon 110, approaches and is inserted into the key hole icon 110.

Since the projection 100a of the key frame icon 100 is engaged with the recess 110a of the key hole icon 110, occupants receive an impression that the key frame icon 100 is held by the key hole icon 110. That is, occupants such a driver have an impression that the key frame icon 100 is inserted into the key hole.

In accordance with stop and start of the engine, the microcomputer 24 highlights the region between the key symbol 102 and the key frame icon 100 in a color that is different from the third display mode. Alternatively, the microcomputer 24 returns the region to the previous state.

Therefore, occupants visually confirm whether the engine is running or not.

Figure 11:
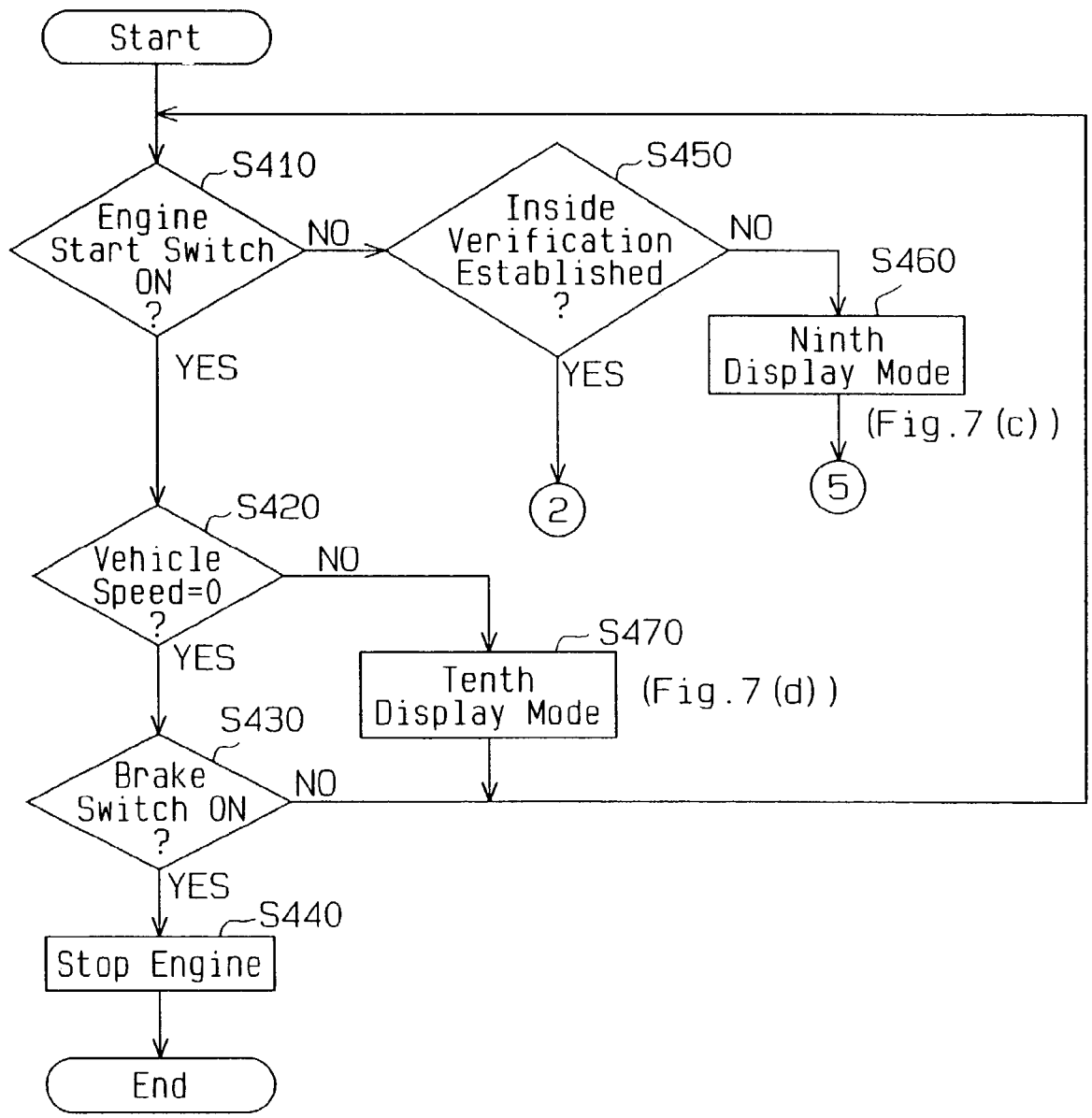
FIG. 11 is a flowchart showing an engine state determination process in FIG. 8.

In step S420 of FIG. 11, the microcomputer 24 judges whether the vehicle is traveling. If an occupant manipulates the engine start switch 33 when the microcomputer 24 judges that the vehicle is running, the first display device 36 shows the tenth display mode (see FIG. 7(d)) to warn the occupant.

As a result, microcomputer 24 informs the occupant that the occupant is trying to stop the engine while the vehicle is traveling, thereby warning the driver.

The recess 53 is located in the center cluster 51 at a part closer to the driver's seat 52 (on the designed surface) The manipulation member 58 for manipulating the engine start switch 33 is located on the lower wall 53a of the recess 53. The manipulation member 58 does not project from the recess 53.

This permits the occupant to easily distinguish the engine start switch 33 from the audio switches 60. The arrangement is therefore effective for operation.

As a main switch having important functions such as starting and stopping of the engine, the operational member 58 is clearly distinguished from the other audio switches 60.

A second embodiment of the present invention will now be described with reference to FIGS. 14(a) and 14(i), and FIGS. 15(a) to 15(d).

In the following embodiments, the differences from the embodiment of FIGS. 1 to 13 will be mainly discussed, and like or the same reference numerals are given to those components that are like or the same as the corresponding components of FIGS. 1 to 13.

This embodiment is the same as the embodiment of FIGS. 1 to 13 except for the first to fifth display modes and the seventh to tenth display modes.

As shown in FIGS. 14(a) to 14(i) and FIGS. 15(a) to 15(d), the key hole icon 110 is omitted from the first to fifth display modes and the seventh to tenth display modes.

Instead of showing the key frame icon 100 being inserted into the key hole icon 110 as described above, a substantially rectangular holding frame 108 surrounding the key frame icon 100 is shown. The holding frame 108 corresponds to a second display image.

Particularly, the fifth display mode (see FIG. 14(d)) gives an impression that the key frame icon 100 is confined in the holding frame 108, in other words, an impression that the key is deposited to the vehicle. The color of the key frame icon 100 is different from the color of the third display mode of FIG. 14(c).

In the fifth display mode, the key symbol 102 is located in the holding frame 108, which gives an impression that the key symbol 102, together with the key frame icon 100, is confined in the holding frame 108.

In the embodiment of FIGS. 1 to 13, when the microcomputer 24 acknowledges two or more portable communication devices 11 each having a valid key ID, the microcomputer 24 enables the portable communication device 11 of the highest reception level of the reception signal. However, in this embodiment, the microcomputer 24 does not determine whether a portable communication device 11 is valid. As in the second display mode of FIG. 15(a), the key frame icons 100 each corresponding to a key ID is shown in a solid line.

In the ninth display mode of FIG. 15(c), the holding frame 108, which shown in a solid line in the fifth display mode of FIG. 14(d), is shown in a broken line.

In the tenth display mode of FIG. 15(d), the holding frame 108 is shown in a solid line.

In addition to the advantages of the embodiments of FIGS. 1 to 13, the second embodiment has the following advantages.

The first display device 36 shows the key symbol 102 as the first display image and shows the holding frame 108 surrounding the key symbol 102 as the second display image. When the engine is not running, the microcomputer 24 shows the key symbol 102 on the first display device 36. When the engine is running, the microcomputer 24 shows the key symbol 102 and the holding frame 108.

When the third display mode (see FIG. 14(c)) is changed to the fifth display mode (see FIG. 14(d)), the key frame icon 100 is surrounded by the holding frame 108. This gives an impression that the key frame icon 100 is confined in the holding frame 108, in other words, an impression that the key is deposited to the vehicle.

A third embodiment of the present invention will now be described with reference to FIGS. 16 to 21, and 23(e).

In this embodiment, the control flowchart of a control program executed by the microcomputer 24 is different from the embodiments of FIGS. 1 to 15(d). Hereinafter, the differences from the embodiments of FIGS. 1 to 15(d) will mainly be discussed, and the same reference numerals are given to those steps that are the same as the corresponding steps in the embodiments of FIGS. 1 to 15(d).

In this embodiment, the control program executed by the microcomputer 24 is basically the same as the program shown in FIG. 8.

Figure 18:
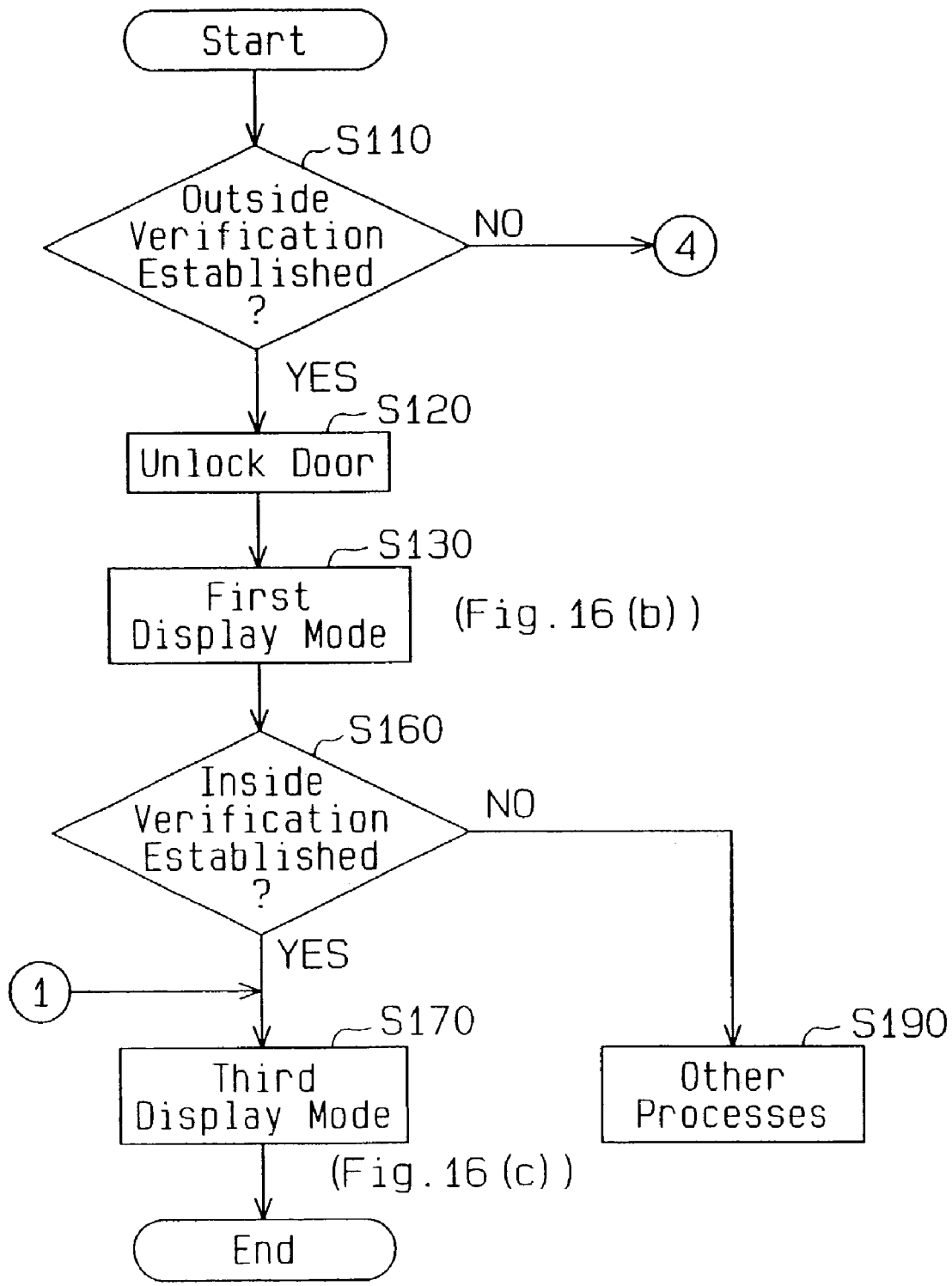
FIG. 18 is a flowchart showing a verification process according to the third embodiment.

FIG. 18 is a verification process routine of this embodiment.

1. Verification Process Routine.

In this embodiment, steps S140, S150, S180 are omitted from the control flowchart of FIG. 9. Since step S150 is omitted, the ACC relay 41 is not automatically activated unlike the first and second embodiments.

In step S130, based on the verification result in step S110, the microcomputer 24 outputs a display control signal to the first display device 36 to cause the first display device 36 to show the first display mode shown in FIG. 16(b).

In the first display mode, a key frame icon 100 representing a frame appears on the display 56 of the first display device 36. Also, a key symbol 102 is shown in the key frame icon 100.

Then, in step S170, the microcomputer 24 shows the third display mode shown in FIG. 16(c). In the third display mode, a character OFF 105 appears above the character GUIDE ACC 120, and an inverted triangle mark M is shown on a side of the character GUIDE ACC 120. The switch unit 57 is located at a part corresponding to the mark M and the character GUIDE ACC 120. In the following discussion, the area of the mark M always corresponds to the switch unit 57.

Instead of the character ACC 103 in the third display mode of FIG. 6(c) and the third display mode of FIG. 14(c), the mark M and the character GUIDE ACC 120 show the location of the operational member 58, or the location of the engine start switch 33, in this embodiment.

2. Engine Start Process Routine

Figure 19:
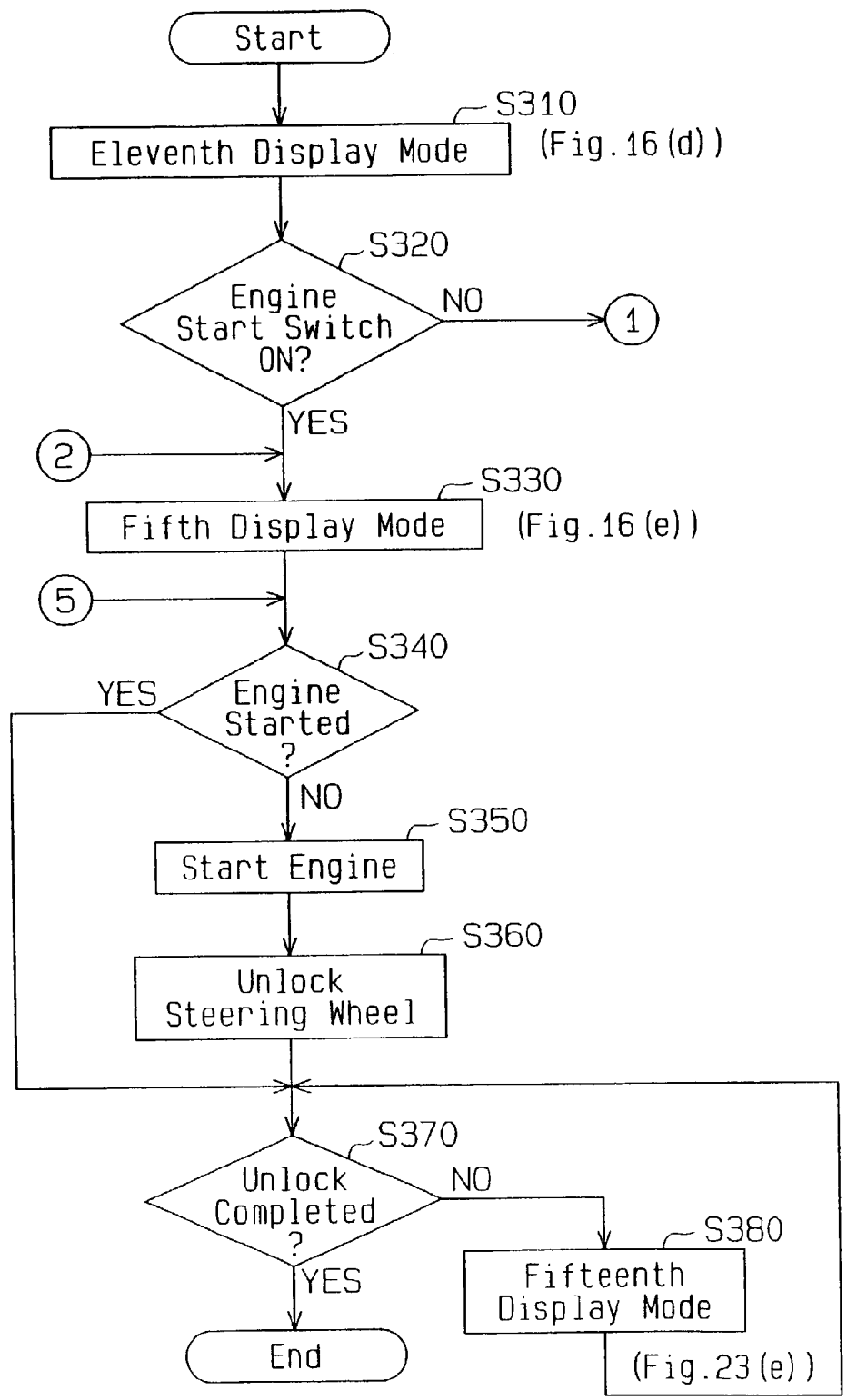
FIG. 19 is a flowchart showing an engine start process according to the third embodiment.

Then, the microcomputer 24 proceeds to step S310 shown in FIG. 19. Step S310 corresponds to a step after the microcomputer 24 judges that the engine is permitted to be started.

The microcomputer 24 outputs a display control signal to the first display device 36, thereby causing the first display device 36 to show an eleventh display mode shown in FIG. 16(d).

In the eleventh display, the mark M and a character GUIDE START 121 appear below the character OFF 105 in the display 56.

In step S310, the microcomputer 24 causes the second display device 37 to continuously emit light.

A fifth display mode (see FIG. 16(e)) of step S330 is the same as the fifth display mode of FIG. 14(d) except that the holding frame 108 is omitted.

In step S370, the microcomputer 24 judges whether the unlocking operation of the steering lock control unit 38 has been completed.

If the outcome of step S370 is negative, that is, if the microcomputer 24 judges that the unlocking operation by the steering lock control unit 38 has not completed, the microcomputer 24 proceeds to step S380. In step S380, the microcomputer 24 causes the first display device 36 to show a fifteenth display mode shown in FIG. 23(e). In the fifteenth display mode, the display 56 shows a phrase "Turn Steering Wheel" 125. Thereafter, the microcomputer 24 returns to step S370. The phrase 125 appears when the unlocking operation has not been completed and instructs occupants on how to unlock the steering shaft from a locking member. If the outcome of step S370 is positive, the microcomputer 24 terminates the engine start process routine and proceeds to an engine state determination process routine shown in FIG. 20.

Figure 20:
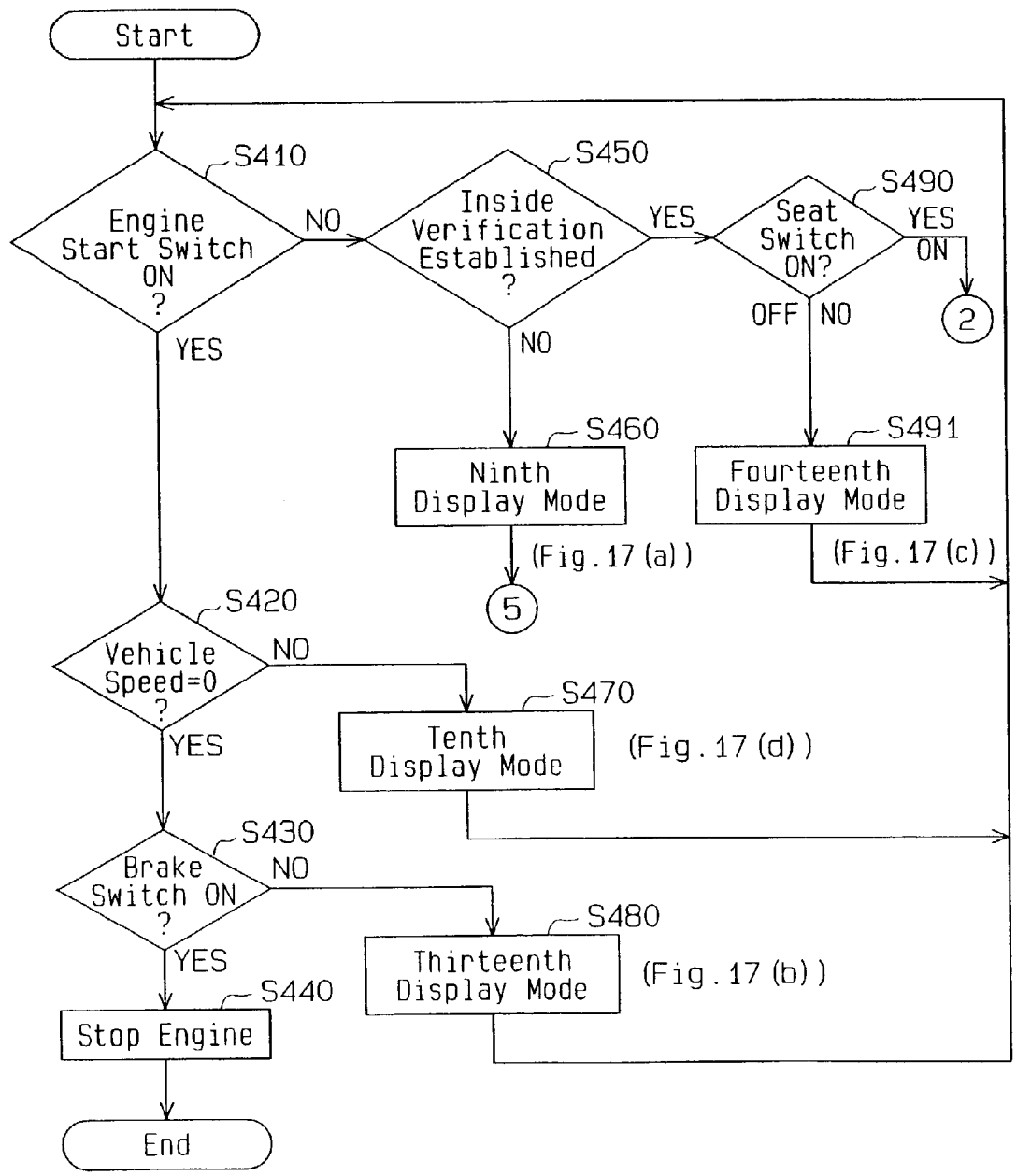
FIG. 20 is a flowchart showing an engine state determination process according to the third embodiment.

In step S470 of the engine state determination process routine of FIG. 20, the microcomputer 24 shows a tenth display mode of FIG. 17(d). The tenth display mode of FIG. 17(d) is the same as the tenth display mode of FIG. 15(d) except that the holding frame 108 and the sandglass symbol 107 are omitted. The sandglass symbol 107 is replaced with a character ON 104. A phrase Stop Car ! 122 is shown below the character ON 104. At this time, the microcomputer 24 may output a warning signal to an alarm (not shown) so that the alarm produces alarm sound.

If the outcome of step S430 of FIG. 20 is negative, that is, if the microcomputer 24 judges that the brake switch 32 is OFF, the microcomputer 24 proceeds to step S480. In step S480, the microcomputer 24 causes the first display device 36 to show a thirteenth display mode shown in FIG. 17(b). The thirteenth display mode of FIG. 17(b) is the same as the fifth display mode of FIG. 16(e) except that a phrase "Brake!" 123 appears below the character ON 104.

If the outcome of step S480 is positive, the microcomputer 24 proceeds to step S410. The phrase 123 instructs the driver to turn on the brake, that is, to step on the brake pedal. At this time, the microcomputer 24 may output a warning signal to an alarm (not shown) so that the alarm produces alarm sound.

If the outcome of step S410 is negative and the outcome of step S450 is positive, that is, if the microcomputer 24 judges that the engine start switch 33 is not ON and the inside verification has been established, the microcomputer 24 proceeds to step S490. In step S490, the microcomputer 24 determines it has received an ON signal from the seat switch 39. If the outcome of step S490 is positive, that is, if an ON signal has been inputted from the seat switch 39, the microcomputer 24 judges that the driver is seated on the driver's seat and proceeds to step S330. If the outcome of step S490 is negative, that is, if an ON signal has not been inputted from the seat switch 39, or if an OFF signal has been inputted from the seat switch 39, the microcomputer 24 proceeds to step S491.

In step S491, the microcomputer 24 causes the first display device 36 to show a fourteenth display mode shown in FIG. 17(c). The fourteenth display mode is the same as the fifth display mode of FIG. 16(e) except that a phrase "Stop Engine!" 124 appears below the character ON 104.

In this case, the microcomputer 24 judges that the driver is not seated on the driver's seat 52 and leaves the vehicle with the engine running and instructs the driver to stop the engine. At this time, the microcomputer 24 may output a warning signal to an alarm (not shown) so that the alarm produces alarm sound.

Figure 21:
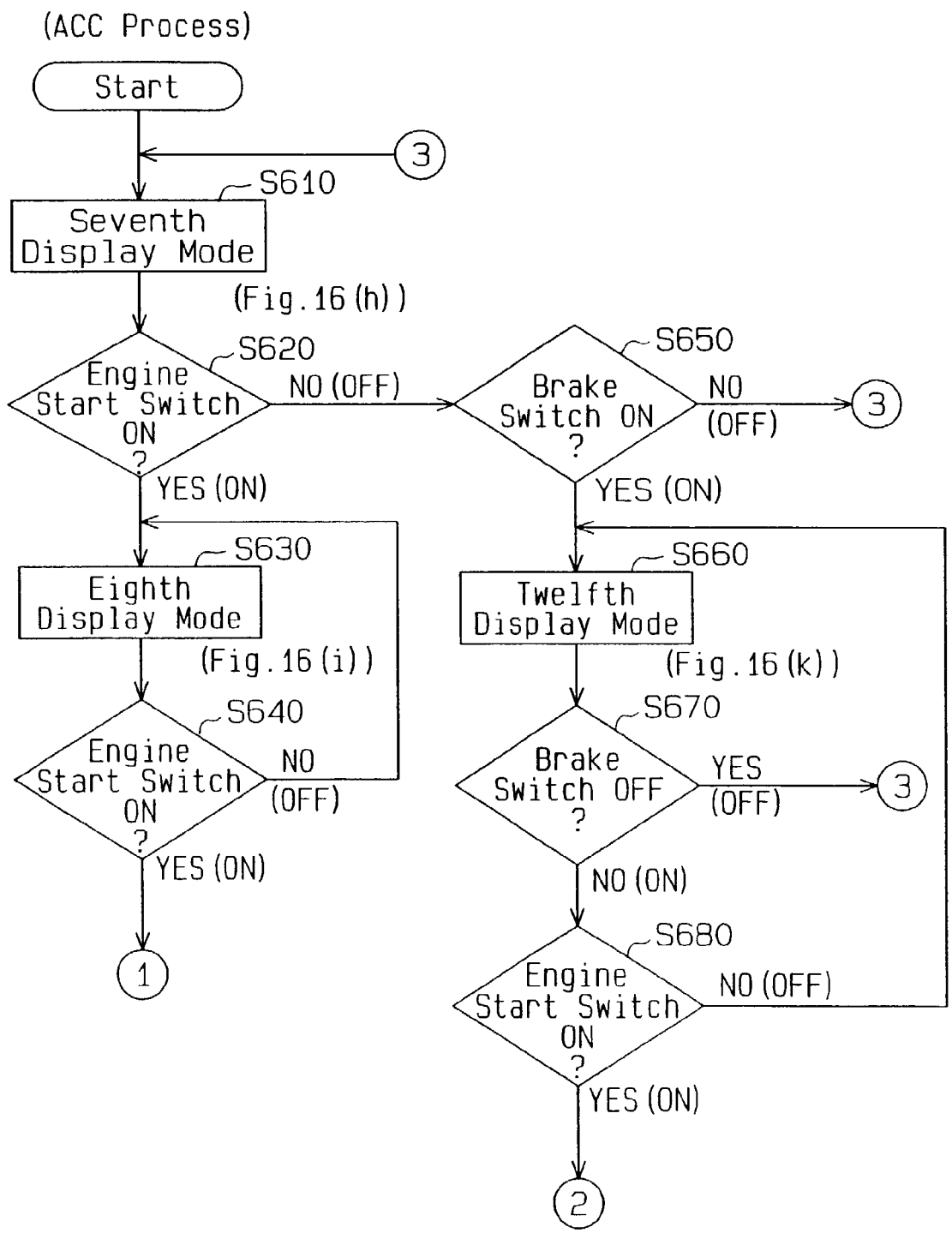
FIG. 21 is a flowchart showing an ACC process according to the third embodiment.
Figure 22:
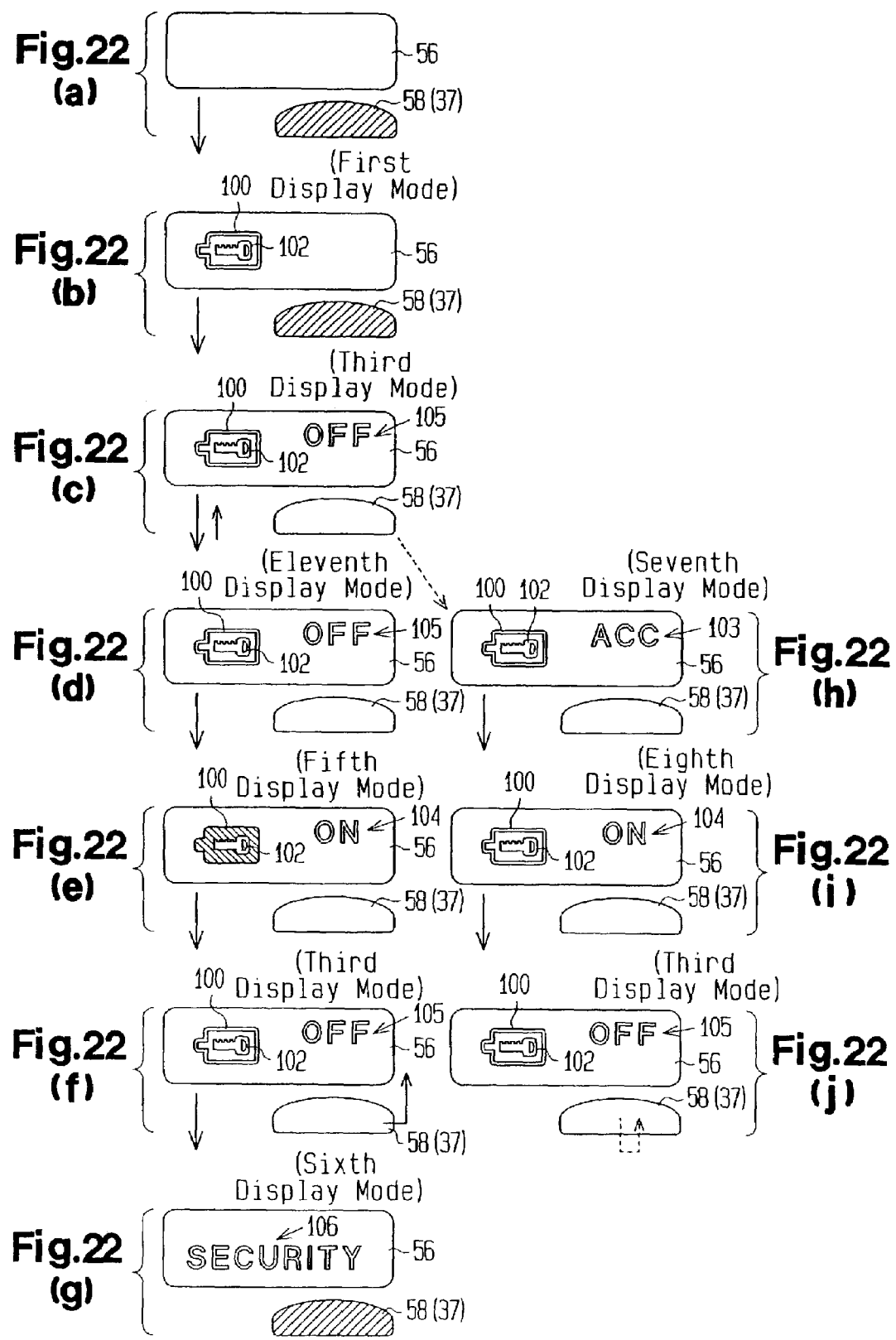
FIG. 22(a) is a diagram showing a display and a manipulation member, which are the same as those of FIG. 6(a)
FIG. 22(b) is a diagram showing the display in a first display mode according to a fourth embodiment.
FIG. 22(c) is a diagram showing the display in a third display mode according to the fourth embodiment.
FIG. 22(d) is a diagram showing the display in an eleventh display mode according to the fourth embodiment.
FIG. 22(e) is a diagram showing the display in a fifth display mode according to the fourth embodiment.
FIG. 22(f) is a diagram showing the display in the third display mode according to the fourth embodiment.
FIG. 22(g) is a diagram showing the display in a sixth display mode according to the fourth embodiment.
FIG. 22(h) is a diagram showing the display in a seventh display mode according to the fourth embodiment.
FIG. 22(i) is a diagram showing the display in an eighth display mode according to the fourth embodiment.
FIG. 22(j) is a diagram showing the display in the third display mode according to the fourth embodiment.
Figure 23:
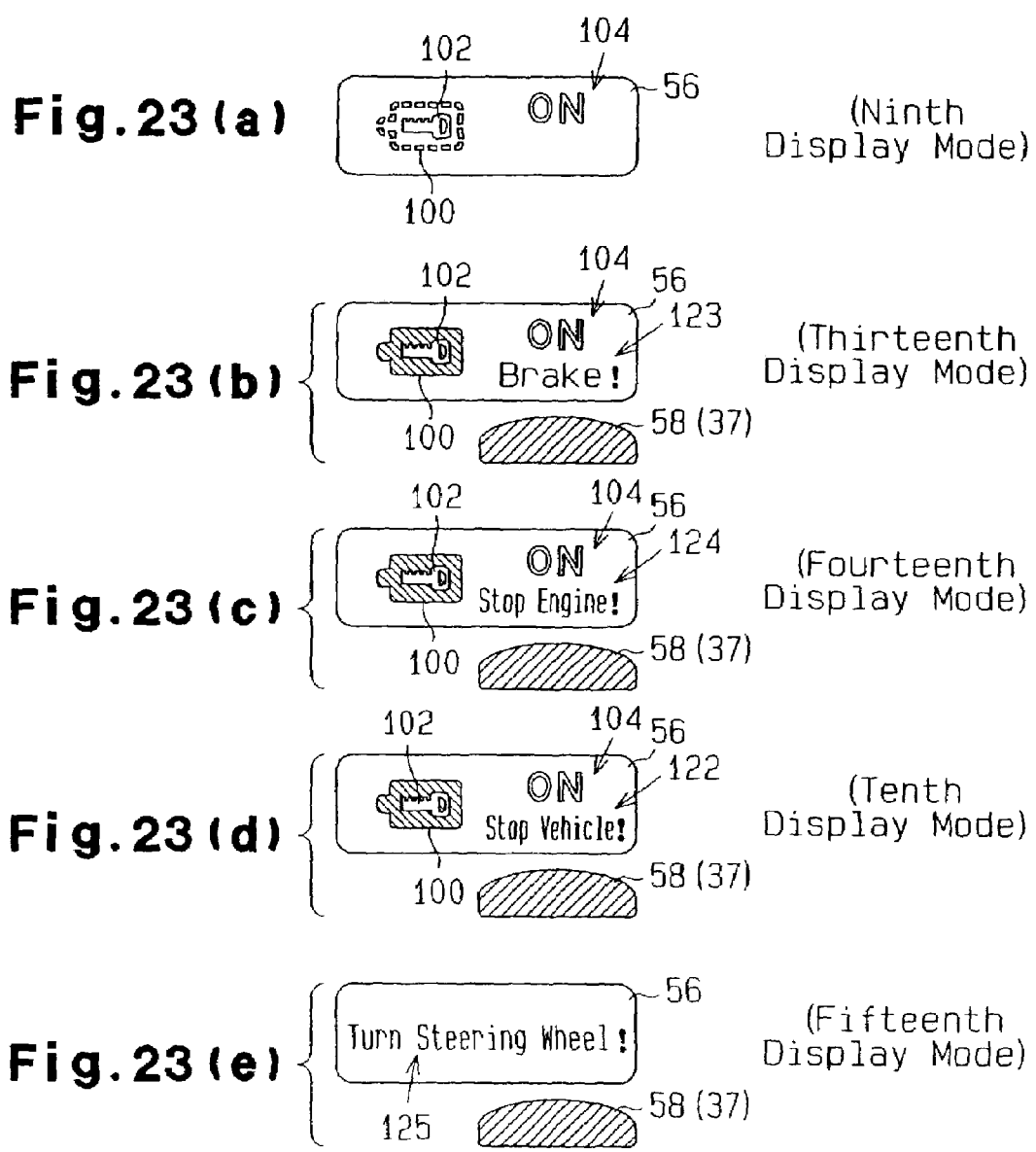
FIG. 23(a) is a diagram showing the display in a ninth display mode according to the fourth embodiment.
FIG. 23(b) is a diagram showing the display in a thirteenth display mode according to the fourth embodiment.
FIG. 23(c) is a diagram showing the display in a fourteenth display mode according to the fourth embodiment.
FIG. 23(d) is a diagram showing the display in a tenth display mode according to the fourth embodiment.
FIG. 23(e) is a diagram showing the display in a fifteenth display mode according to the third embodiment.

The microcomputer executes an accessory (ACC) process routine shown in FIG. 21. In step S610 of FIG. 21, the microcomputer 24 causes the first display device 36 to show a seventh display mode shown in FIG. 16(h). In the seventh display mode, the key frame icon 100, the key symbol 102, the character ACC 103, the mark M, and the character GUIDE ON 130 appear on the display 56. The character ACC 103 appears on a part that corresponds to the manipulation member 58. The mark M and the character GUIDE ON 130 are shown below the character ACC 103.

Figure 12:
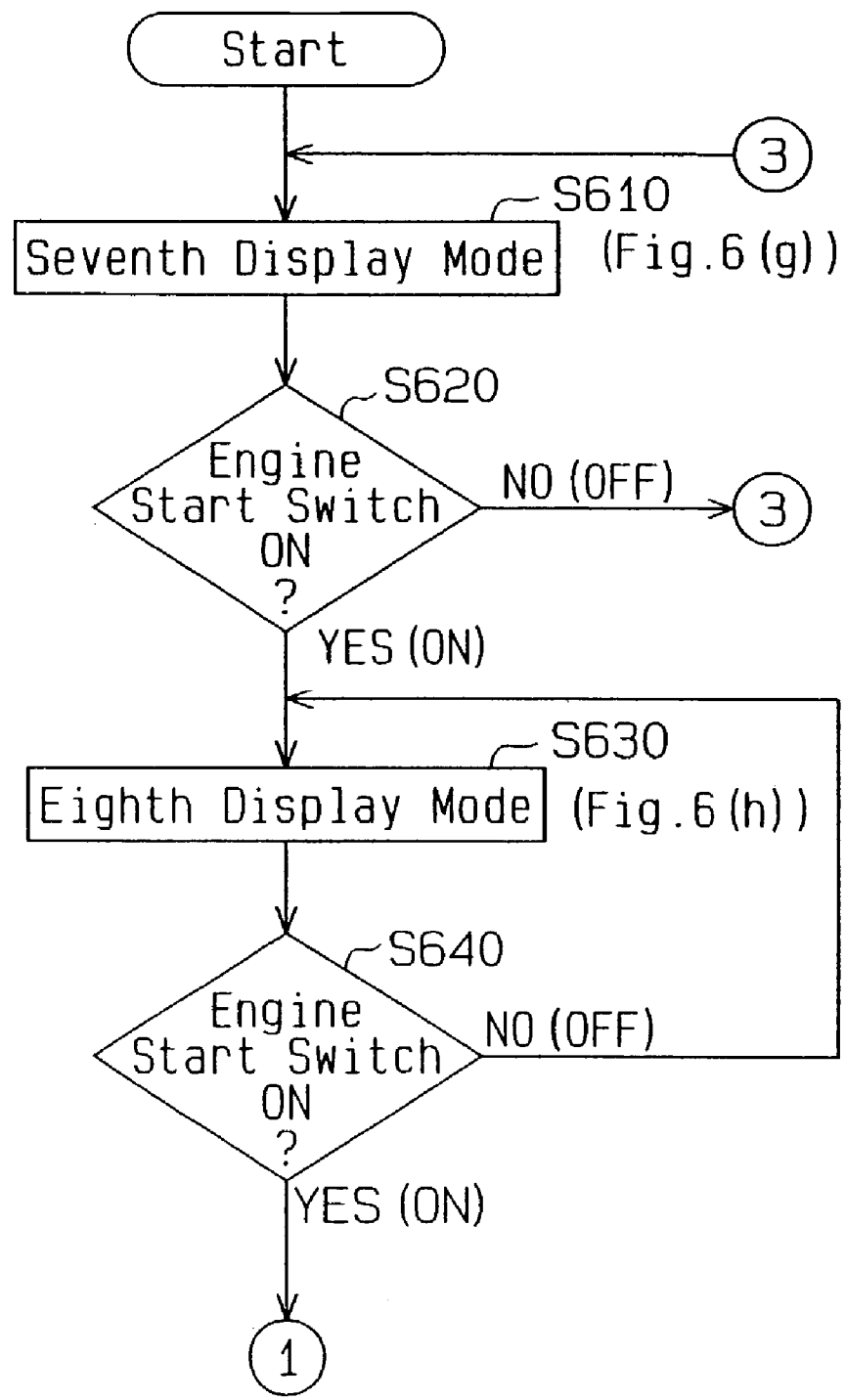
FIG. 12 is a flowchart showing an ACC process in FIG. 8.

Unlike step S610 of FIG. 12 (corresponding to FIG. 6(g)), the ACC relay 41 is not activated in step S610 of this embodiment.

Then, the microcomputer 24 proceeds to step S620. If the outcome of step S620 is positive, that is, if the microcomputer 24 receives an ON signal from the engine start switch 33, the microcomputer 24 performs ACC activation. Specifically, the microcomputer 24 outputs an ACC activation signal to the relay control unit 47. Based on the ACC activation signal, the relay control unit 47 supplies an excitation current to the actuation coil 41b of the ACC relay 41. Then, the microcomputer 24 proceeds to step S630.

In step S630, the microcomputer 24 causes the first display device 36 to show an eighth display mode shown in FIG. 16(i). In the eighth display mode, the key frame icon 100, the key symbol 102, the character ON 104, the mark M, and the character GUIDE OFF 131 appear on the display 56. The character ON 104 appears on a part that corresponds to the manipulation member 58. The mark M and the character GUIDE OFF 131 are shown below the character ON 104. Then, the microcomputer 24 proceeds to step S640. In step S640, the microcomputer 24 determines whether it has received an ON signal from the engine start switch 33.

If the outcome of step S640 is negative, that is, if the microcomputer 24 has not received an ON signal, the microcomputer 24 returns to step S630. If the outcome of step S640 is positive, that is, if the microcomputer 24 has received an ON signal, the microcomputer returns to step S170 of the verification process routine of FIG. 9.

That is, after step S640, the microcomputer 24 causes the ACC relay 41 to stop sending a control signal to the relay control unit 47 of the start control unit 35. Based on the stop of the control signal, the relay control unit 47 stops excitation current from the ACC relay 41 to the actuation coil 41b. As a result, the ACC relay 41 is turned off and the current to the ACC system is stopped. Thereafter, the microcomputer 24 proceeds to step S170 of FIG. 9. Thus, the display 56 is changed from the eighth display mode (see FIG. 16(i)) to the third display mode (see FIGS. 16(c) and 16(j)).

If the outcome of step S610 is negative, that is, if the microcomputer 24 has not received an ON signal from the engine start switch 33, the microcomputer 24 proceeds to step S650. If the outcome of step S650 is negative, that is, if the microcomputer 24 has received a brake OFF signal, the microcomputer S610 returns to step S610. If the outcome of step S650 is positive, that is, if the microcomputer 24 has received a brake ON signal, the microcomputer 24 proceeds to step S660.

In step S660, the microcomputer 24 causes the first display device 36 to show a twelfth display mode shown in FIG. 16(k). In the twelfth display mode, the key frame icon 100, the key symbol 102, the character ACC 103, the mark M, and the character GUIDE START 121 appear on the display 56. The character ACC 103 appears on a part that corresponds to the manipulation member 58. The mark M and the character GUIDE START 121 are shown below the character ACC 103.

Then, the microcomputer 24 proceeds to step S670. In step S670, the microcomputer 24 judges whether it has received a brake OFF signal. If the outcome of step S670 is positive, that is, if the microcomputer 24 has received a brake OFF signal, the microcomputer 24 returns to step S610. If the outcome of step S670 is negative, that is, if the microcomputer 24 has not received a brake ON signal, the microcomputer 24 proceeds to step S680.

If the outcome of step S680 is positive, that is, if the microcomputer 24 has received an ON signal from the engine start switch 33, the microcomputer 24 proceeds to step S330 in the engine start process shown in FIG. 10.

After the microcomputer 24 proceeds to step S330, the display 56 is changed from the twelfth display mode of FIG. 16(k) to the fifth display mode of FIG. 6(d). If the engine has not been started, the microcomputer 24 proceeds to step S350 after step S340 and executes the engine start process.

If the outcome of step S680 is negative, that is, if the microcomputer 24 has not received an ON signal from the engine start switch 33, the microcomputer 24 returns to step S660.

In addition to the advantages of the embodiment shown in FIGS. 1 to 13, this embodiment provides the following advantages.

When the engine start switch 33 is not manipulated, the second display device 37 is turned off as shown in FIGS. 16(a), 16(b), and 16(g). When the engine start switch 33 is enabled, the second display device 37 continuously emits light as shown in FIGS. 16(c) to 16(f), and 16(h) to 16(k). When the microcomputer 24 cannot acknowledge a portable communication device 11, the second display device 37 is turned off or blinked as shown in FIGS. 17(b) to 17(d).

Accordingly, occupants such as a driver are reliably informed of the state of the engine start switch 33.

The character OFF 105 and the character ON 104 in FIGS. 16(c) to 16(f) show the state in which the engine is not running and the state in which the engine is running, respectively. Thus, occupants can visually confirm the state of the engine. The character GUIDE ACC 120 and the character GUIDE START 121 in FIGS. 16(c), 16(d), and 16(f) function to guide the manipulation of the manipulation member 58. Thus, occupants can visually confirm the manipulation procedure of the engine start switch 33.

The character ACC 103, the character ON 104, and the character OFF 105 shown in FIGS. 16(h) to 16(k) show the state of the engine start switch 33, which functions as a power switch. Specifically, the characters 103 to 105 whether the engine start switch 33 is functioning as a switch of electric components, in an ON state or in an OFF state.

The character GUIDE ACC 120, the character GUIDE ON 130, the character GUIDE OFF 131, and the character GUIDE START 121 guide the operation of the engine start switch 33. The characters 120, 130, 131, and 121 guides the operation of the engine start switch 33 by showing operational functions.

In step S430, the microcomputer 24 determines whether the brake pedal is being depressed (see FIG. 20). When determining that the brake switch 32 is OFF and that the engine start switch 33 is manipulated, the microcomputer 24 causes the first display device 36 to show an alarm of the thirteenth display mode.

Therefore, the driver is warned that the engine was stopped without operation of the brake.

A fourth embodiment of the present invention will now be described with reference to FIGS. 22(a) to 23(e).

In this embodiment, the hardware structure is substantially the same as the embodiment of FIGS. 16(a) to 21. This embodiment is different from the embodiment of FIGS. 16(a) to 21 in that a part of the control flowchart is omitted.

That is, in the ACC process routine shown in FIG. 21, steps S650 to S680 are omitted, and when the outcome of step S620 is negative, the microcomputer 24 returns to step S610.

Unlike the corresponding display modes in the embodiment of FIGS. 16(a) to 21, the mark M, the character GUIDE ACC 120, the character GUIDE START 121, the character GUIDE ON 130, and the character GUIDE OFF 131 are omitted in a third display mode (FIGS. 22(c) and 22(f)), a seventh display mode (FIG. 22(h)), an eighth display mode (FIG. 22(i)), and an eleventh display mode (FIG. 22(d)) of this embodiment.

This embodiment has the same advantages as the embodiments shown in FIGS. 1 to 21.

A fifth embodiment according to the present invention will now be described with reference to FIGS. 24 to 26(d).

The hardware structure of this embodiment is different from that of the embodiment of FIGS. 16(a) to 21 in the structure of the engine start switch 33 and the surrounding structure.

Figure 24:
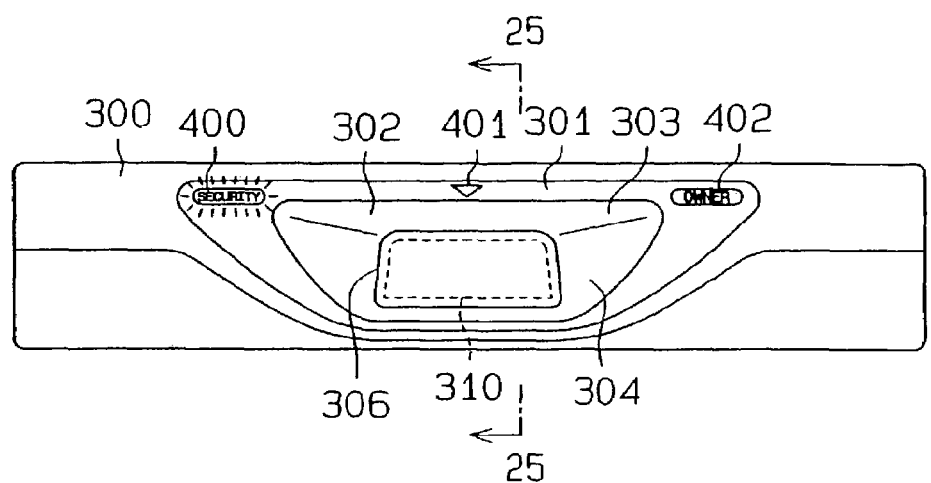
FIG. 24 is a front view illustrating a display device according to a fifth embodiment.
Figure 25:
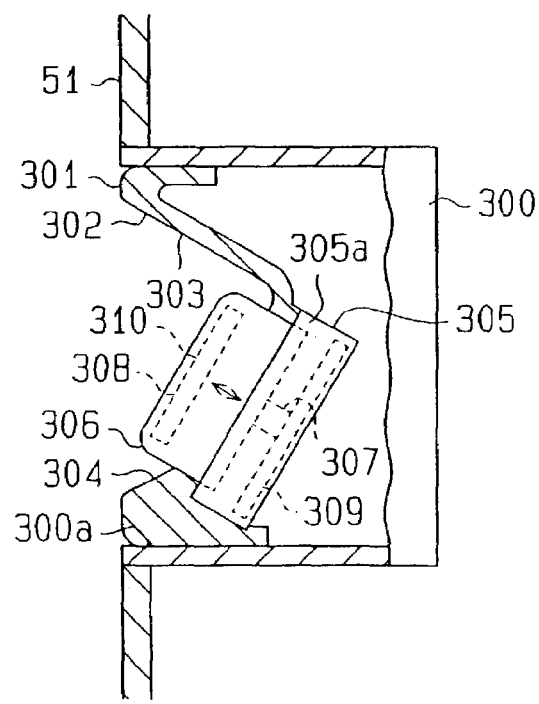
FIG. 25 is a cross-sectional view taken along line 25—25 of FIG. 24.
Figure 27:
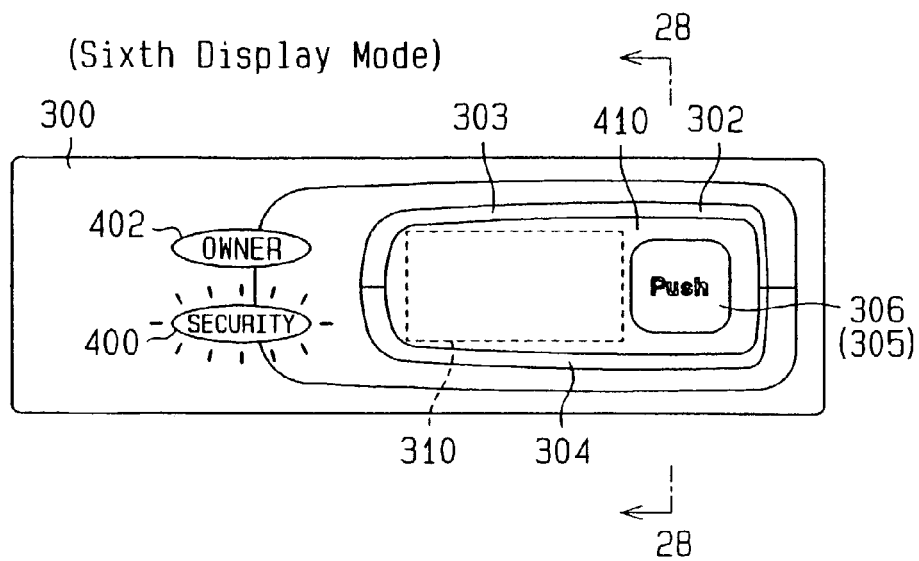
FIG. 27 is a front view illustrating a display device according to a sixth embodiment.

As shown in FIGS. 24 and 25, a switch device 300 is located in the center cluster 51. The switch device 300 includes a case 300a and a bezel 301. The case 300a of the switch device 300 has an opening toward the interior of the passenger compartment. The bezel 301 is fixed to the opening. The bezel 301 has a recess 302. As shown in FIG. 25, an upper wall 303, which define part of the recess 302, extends downward in a slanting manner. A lower wall 304, which forms a part of the recess 302, extends downward in a slanting manner.

A switch unit 305 is provided on a lower wall 304. The switch unit 305 includes a manipulation member 306, an engine start switch 307, and a display unit 308.

The engine start switch 307 is fixed to a board 309 provided in a housing 305a of the switch unit 305. The engine start switch 307 is a momentary push switch.

The manipulation member 306 is located in an opening of the housing 305a that opens to the recess 302. The manipulation member 306 is moved when pressed (see arrow in FIG. 25). The manipulation member 306 is always located in the recess 302 and does not project from the recess 302. The manipulation member 306 is arranged along the lower wall 304 of the recess 302 and can be manipulated by, for example, a finger of a driver. When pressed by, for example, a driver, the manipulation member 306 presses the engine start switch 307. Accordingly, the engine start switch 307 is selectively turned ON and OFF.

The display unit 308 is located in the manipulation member 306. Occupants in the passenger compartment can see the display 310 of the display unit 308. The surface of the display 310 is covered with a transparent cover forming the manipulation member 306. The display 310 of the display unit 308 is a color liquid crystal display.

As shown in FIG. 24, a security display 400, an inverted triangular mark display 401 functioning as an indicator, and a user display 402 are arranged from the left in an area above the bezel 301. Each of the displays 400 to 402 includes a plurality of LEDs. Each of the displays 400 to 402 emits light when the LEDs are activated. A character SECURITY is printed on the surface of the security display 400, and a character OWNER is printed on the surface of the user display 402.

The electrical configuration of this embodiment is different from that of the embodiment shown in FIGS. 16(a) to 21 in that first display device 36 and the second display device 37 are replaced by the display unit 308, the security display 400, the mark display 401, and the user display 402. The display unit 308, the security display 400, the mark display 401, and the user display 402 are connected to the microcomputer 24. Also, the engine start switch 33 is replaced by the engine start switch 307. The other electrical configuration is the same as that of the embodiment shown in FIGS. 16(a) to 21.

An operation of this embodiment will now be described.

In the following description, only the difference from the control flowchart of FIGS. 13 and the control flowchart of FIGS. 18 to 21 will be described.

1. Verification Process Routine.

In this embodiment, when proceeding to step S130, the microcomputer 24 shows a first display mode. In the first display mode, the microcomputer 24 controls the mark display 401 and the user display 402 to blink for a predetermined period (for example, several seconds) and then causes the mark display 401 and the user display 402 to continuously emit light.

In the third display mode, the microcomputer 24 controls the mark display 401 and the user display 402 to blink for a predetermined period (for example, several seconds) and then causes the mark display 401 and the user display 402 to continuously emit light.

The mark display 401 clearly shows the location of the manipulation member 306 (the engine start switch 307) in the third display mode.

The other steps in the verification process routine are the same as those of the control flowchart shown in FIG. 18.

2. Engine Start Process Routine

In this embodiment, steps S370 and S380 are omitted from the control flowchart of FIG. 19.

In the eleventh display mode of step S310, the microcomputer 24 causes the mark display 401 and the user display 402 to continuously emit light. In the eleventh display mode, the microcomputer 24 causes the display 310 of the display unit 308 to show the character START (see FIG. 26(a)).

In the fifth display mode of step S330, the microcomputer 24 causes the mark display 401 and the user display 402 to continuously emit light. In the fifth display mode, the microcomputer 24 causes the display 310 to show the character STOP (see FIG. 26(b)).

3. Engine State Determination Process Routine

The routine of this embodiment is the same as the control flowchart of FIG. 20 except that steps S490 and S491 are omitted and that, if the outcome of step S450 is positive, the microcomputer 24 proceeds to step S330 of FIG. 19. In this embodiment, steps S470 and S480 are omitted. If the outcome of each of steps S420 and S430 is negative, the microcomputer 24 returns to step S410.

In the ninth display mode (not shown) of step S460, the microcomputer 24 causes the mark display 401 and the user display 402 to blink. In the ninth display mode, the microcomputer 24 causes the display 310 to show the character STOP. As a result, if the outcome of step S450 is negative, the mark display 401 and the user display 402 blink to indicate that the engine start switch 307 is in a particular state.

4. Accessory (ACC) Process Routine

The routine of this embodiment is the same as the control flowchart of FIG. 21 except that steps S650 to S680 are omitted, and that, if the outcome of step S620 is negative, the microcomputer 24 proceeds to step S610.

In the seventh display mode of step S610, the microcomputer 24 causes the mark display 401 and the user display 402 to continuously emit light. In the seventh display mode, the microcomputer 24 causes the display 310 to show the character ACC (see FIG. 26(c)).

In the eighth display mode of step S630, the microcomputer 24 causes the mark display 401 and the user display 402 to continuously emit light. In the eighth display mode, the microcomputer 24 causes the display 310 to show the character ON (see FIG. 26(d)).

5. Security Process Routine

Figure 13:
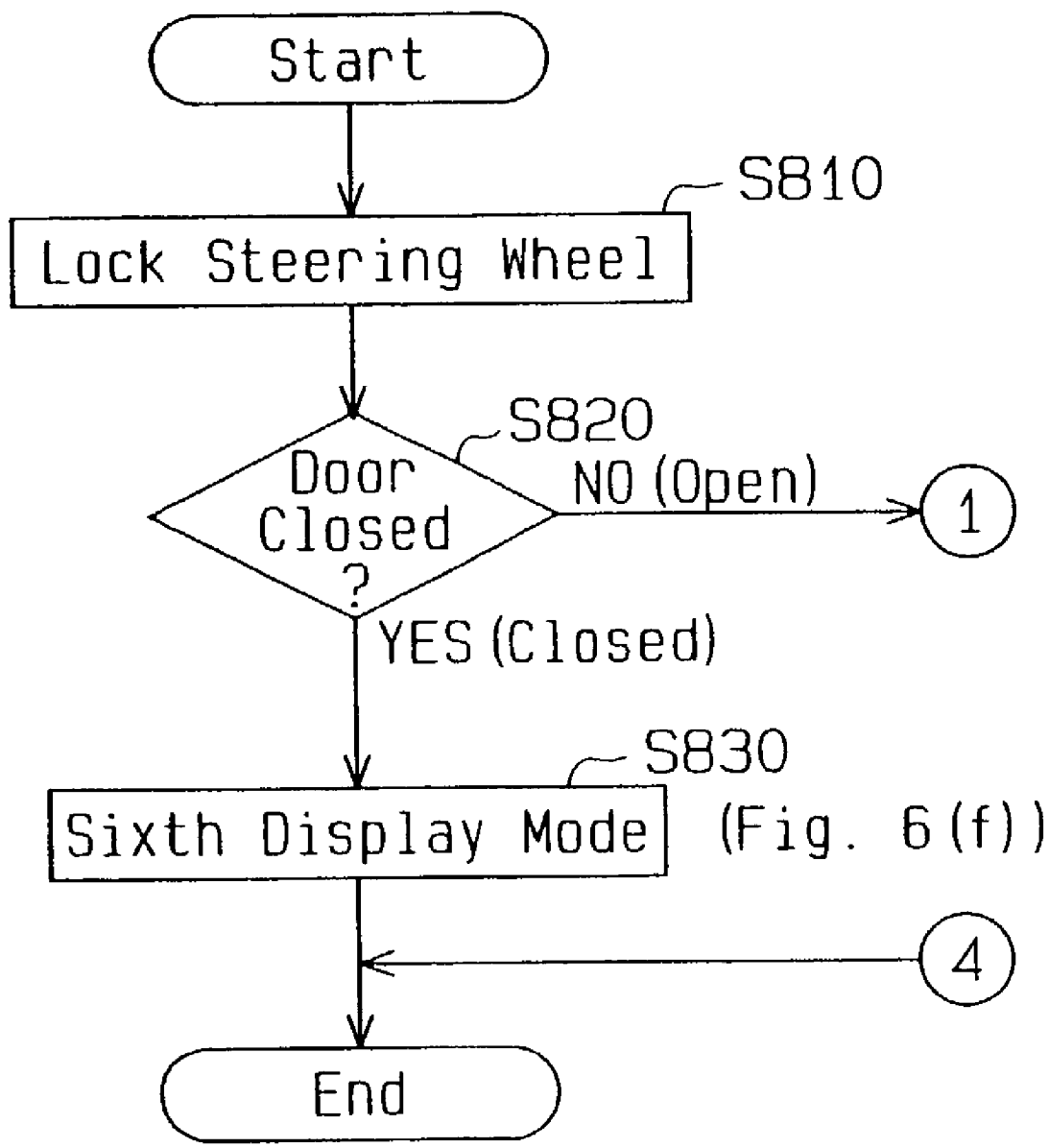
FIG. 13 is a flowchart showing a security process in FIG. 8.

In this embodiment, the microcomputer 24 turns off the mark display 401 and the user display 402 in step S830 shown in FIG. 13. In the sixth display mode, the microcomputer 24 turns off the display 310 and causes the security display 400 to continuously emit light (see FIG. 24).

This embodiment provides the following advantages.

When identifying a portable communication device 11 having a valid key ID, the microcomputer 24 causes the mark display 401 and the display unit 308 to continuously emit light. That is, occupants are informed that the microcomputer 24 has acknowledged the portable communication device 11.

Therefore, when the portable communication device 11 having a valid key ID has been identified by the microcomputer 24, the location of the engine start switch 307 is clearly indicated. Thus, the identification of the portable communication device 11 having a valid key ID is informed to the occupants.

Therefore, in accordance with the result of the acknowledgement of the portable communication device 11 having a valid key ID, the microcomputer 24 enables manipulation of the engine start switch 307. When enabling manipulation of the engine start switch 307, the microcomputer 24 shows the acknowledgement result on the mark display 401 and the display unit 308.

In this manner, the occupants are informed that manipulation of the engine start switch 307 is enabled. Before the engine start switch 307 is enabled, the identification of a portable communication device 11 having a valid key ID has not been completed. Therefore, the engine cannot be started.

The states of the mark display 401 and the display unit 308 change in accordance with the state of the engine start switch 307. The states of the mark display 401 and the display unit 308 vary in the following states, that is, when the engine start switch 307 is not manipulated, when the engine start switch 307 is enabled, and when the microcomputer 24 cannot acknowledge a portable communication device 11.

Accordingly, occupants such as a driver are reliably informed of the state of the engine start switch 307.

A sixth embodiment according to the present invention will now be described with reference to FIGS. 27 to 32.

This embodiment is a modification of the embodiment shown in FIGS. 24 to 26(d). Like or the same reference numerals are given to those components that are like or the same as the corresponding components of the embodiment shown in FIGS. 24 to 26(d). Mainly, the differences from the embodiment shown in FIGS. 24 to 26(d) will be discussed below.

Figure 28:
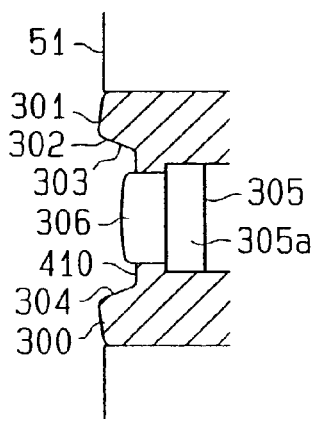
FIG. 28 is a cross-sectional view taken along line 28—28 of FIG. 27.
Figure 29:
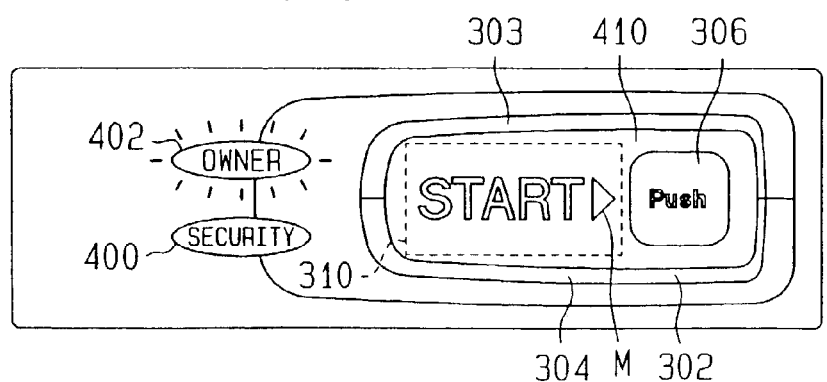
FIG. 29 is a diagram showing the display device of FIG. 27 in an eleventh display mode.
Figure 30:
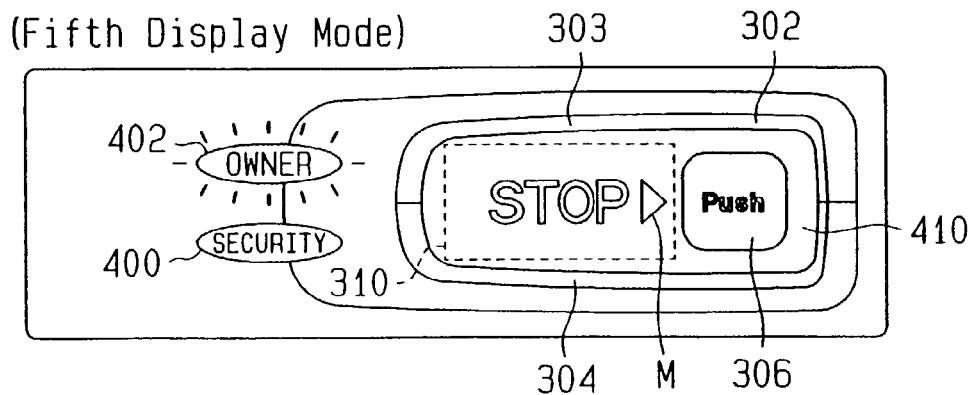
FIG. 30 is a diagram showing the display device of FIG. 27 in a fifth display mode.
Figure 31:
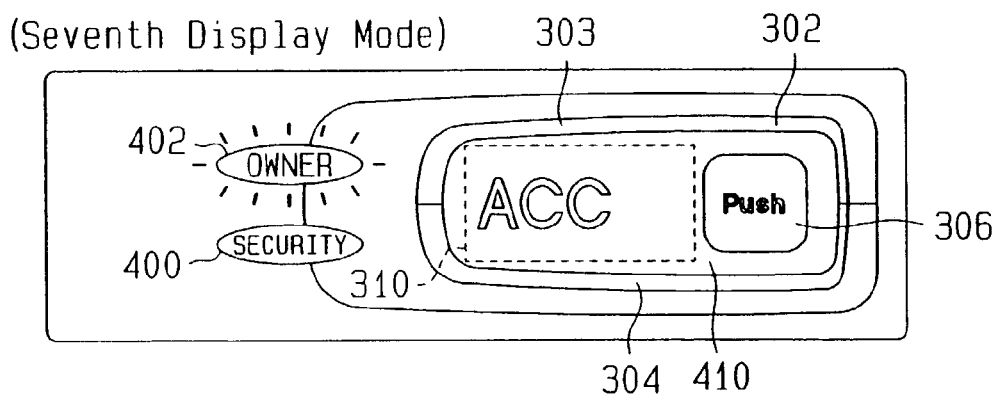
FIG. 31 is a diagram showing the display device of FIG. 27 in a seventh display mode.
Figure 32:
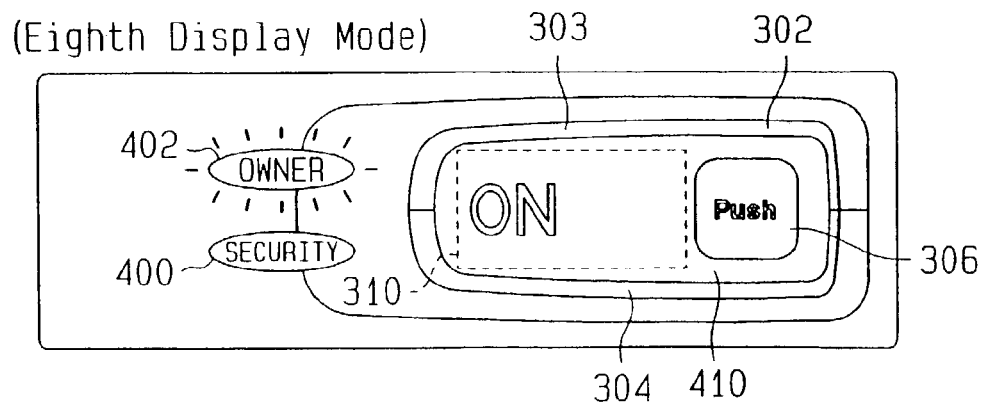
FIG. 32 is a diagram showing the display device of FIG. 27 in an eighth display mode.

In this embodiment, the cross-sectional shape of the recess 302 is different from that of the embodiment shown in FIGS. 24 to 26(d). Sidewalls defining a part of the recess 302 slantly extend to approach each other toward the bottom of the recess 302. A bottom surface 410, which functions as a mount surface, extends vertically along the longitudinal direction of the switch device 300. The upper wall 303, the lower wall 304, the sidewalls are connected to the upper, lower and sides of the bottom wall 410, respectively. As shown in FIG. 28, the cross-sectional shape of the recess 302 is substantially trapezoidal.

The switch unit 305 is located closer to one side of the bottom surface 410. In this embodiment, the switch unit 305 is located closer to the right side (see FIG. 27).

A display of the display unit 308 is located on the bottom surface 410. The bottom surface 410 is made of transparent material and covers the display 310.

The manipulation member 306 is arranged to be always located in the recess 302 and not to project from the recess 302. A character "Push" is printed on the surface of the manipulation member 306.

The security display 400 and the user display 402 are arranged on a part of the bezel 301 about the recess 302 in the vertical direction. In this embodiment, the mark display 401 is omitted.

An operation of this embodiment will now be described.

The control flowchart executed by the microcomputer 24 in this embodiment is substantially the same as that of the embodiment shown in FIGS. 24 to 26(d). Therefore, in the following description, the control flowcharts of FIGS. 18 to 21 are used. As for the display modes, the difference from the display modes of the embodiments shown in FIGS. 24 to 26(d) will mainly be discussed.

1. Verification Process Routine.

In this embodiment, when proceeding to step S130, the microcomputer 24 shows a first display mode. In the first display mode, the microcomputer 24 controls the user display 402 to blink for a predetermined period (for example, several seconds) and then causes the user display 402 to continuously emit light.

In the third display mode, the microcomputer 24 controls the user display 402 to blink for a predetermined period (for example, several seconds) and then causes the user display 402 to continuously emit light. At this time, the microcomputer 24 only shows a mark M shown in FIG. 29 on the display 310 to show the location of the manipulation member 306. In this embodiment, only the mark M is shown. In this case, the mark M clearly shows the location of the manipulation member 306 (the engine start switch 307) in the third display mode.

2. Engine Start Process Routine

In the eleventh display mode of step S310 in FIG. 19, the microcomputer 24 turns on the user display 402. In the eleventh display mode, the microcomputer 24 causes the display 310 to show the character START and the mark M to indicate the location of the manipulation member 306 (see FIG. 29).

In the fifth display mode of step S330 in FIG. 19, the microcomputer 24 turns on the user display 402. In the fifth display mode, the microcomputer 24 causes the display 310 to show the character STOP and the mark M to indicate the location of the manipulation member 306 (see FIG. 30).

3. Engine State Determination Process Routine

In the ninth display mode of step S460 in FIG. 20, the microcomputer 24 controls the user display 402 to blink. In the ninth display mode, the microcomputer 24 causes the display 310 to show the character STOP. As a result, if the inside verification is determined not to have been completed in step S450, the user display 402 blinks to inform occupants of an abnormality.

4. Accessory (ACC) Process Routine

In the seventh display mode of step S610 in FIG. 21, the microcomputer 24 turns on the user display 402. In the seventh display mode, the microcomputer 24 causes the display 310 to show the character ACC (see FIG. 31).

In the eighth display mode of step S630 in FIG. 21, the microcomputer 24 turns on the user display 402. In the eighth display mode, the microcomputer 24 causes the display 310 to show the character ON (see FIG. 32).

5. Security Process Routine

In the sixth display mode of step S830 (see FIG. 13) in this routine, the microcomputer 24 turns off the user display 402. In the sixth display mode, the microcomputer 24 turns off the display 310 and causes the security display 400 to continuously emit light.

This embodiment has the same advantages as the embodiment shown in FIGS. 24 to 26(d).

It should be apparent to those skilled in the art that the present invention may be embodied in many other specific forms without departing from the spirit or scope of the invention. Particularly, it should be understood that the invention may be embodied in the following forms.

In the embodiments of FIGS. 1 to 15(d), when the inside verification cannot be executed due to a malfunction of a portable communication device 11 having a valid key ID after the microcomputer 24 identifies the portable communication device 11, the frame of the key frame icon 100 is shown with broken line in the ninth display mode shown in FIGS. 7(c) and 15(c). Instead, the color of the frame shown in the fifth display mode of FIGS. 6(d) and 14(d) may be changed. Alternatively, the frame may blink.

In the embodiment of FIGS. 1 to 13, the frame of the key frame icon 100 of a portable communication device 11 having an invalid key ID may blink in the second display mode of FIG. 7(a).

In the embodiment of FIGS. 1 to 13, when the third display mode of FIG. 6(c) is changed to the fifth display mode, the key frame icon 100 may be rotated using an animation effect before being engaged with the key hole icon 110.

In the embodiment of FIGS. 24 to 26(d), the character ACC is shown on the display 310 in the seventh display mode, and the character ON is shown on the display 310 in the eighth display mode. Alternatively, as shown in FIG. 26(e), an ACC light-emitting portion 500 and an ON light-emitting portion 501 each having a plurality of LEDs may be provided on the bezel 310. The ACC light-emitting portion 500 may continuously emit light in the seventh display mode of FIG. 26(c), and the ON light-emitting portion 501 may continuously emit light in the eight display mode.

In the embodiments of FIGS. 1 to 32, the engine start switches 33, 307 are momentary push switches, and the engine start switches 33, 307 of the manipulation members 58, 306 are pressed when manipulated. Instead, the manipulation members 58, 306 may be horizontally slidable along the inner surface of the recesses 53, 302, and momentary slide switches that are pressed by the slid manipulation members 58, 306 may be provided.

In the embodiment of FIGS. 1 to 13, the second display device 37 is turned off or blinks in accordance with whether the engine start switch 33 is in particular states. Instead, the second display device 37 may continuously emit light in a color that is different from the color used when the engine start switch 33 is not in the particular states.

In the embodiment of FIGS. 1 to 13, the microcomputer 24 may change the color of the key symbol 102 in accordance with whether the engine is running.

In the embodiments of FIGS. 1 to 15(d), the number of portable communication devices 11 having valid key IDs is not limited to two in the second display mode (see FIGS. 7(a) and 15(a)). The display 56 may be enlarged to show three or more icons corresponding to portable communication devices 11.

In the embodiment of FIGS. 1 to 13, one of the first display device 36 and the second display device 37 may be omitted.

Therefore, the present examples and embodiments are to be considered as illustrative and not restrictive and the invention is not to be limited to the details given herein, but may be modified within the scope and equivalence of the appended claims.

What is claimed is:

1. A vehicle engine starting apparatus comprising:
    a start switch for starting the engine of the vehicle, the start switch being a momentary push switch;
    a display device for showing the location of the start switch, the display device having a plurality of display images;
    a remote device for outputting a specific remotely broadcast signal representing that the start switch will be operated by an authorized operator;
    an identify device for identifying the specific remotely broadcast signal; and
    a control device for controlling the display device to emit light in accordance with the identification executed by the identify device.

2. The apparatus according to claim 1, wherein the display device includes an emitter, the emitter being located in the vicinity of the start switch.

3. The apparatus according to claim 1, wherein, when the specific remotely broadcast signal is acknowledged by the identify device, the control device enables the start switch so that the operation of the start switch is valid, and causes the display device to show information representing that the specific signal has been acknowledged.

4. The apparatus according to claim 1, wherein, when the specific remotely broadcast signal is acknowledged by the identify device, the control device enables the start switch so that the operation of the start switch is valid, and wherein the control device causes a displaying state of the display device to be different according to whether the display device is enabled or not.

5. The apparatus according to claim 1, wherein, when the control device receives a predetermined switching signal, the control device causes the start switch to function as a power switch of on-vehicle electrical devices, and causes the display device to show information representing whether the power switch is ON or OFF.

6. The apparatus according to claim 5, wherein the switching signal is a signal representing that the brake of the vehicle is not applied.

7. The apparatus according to claim 1, wherein, when the specific remotely broadcast signal is acknowledged by the identify device, the control device causes the display device to show an image of a key.

8. The apparatus according to claim 1, wherein the specific remotely broadcast signal is one of a plurality of specific remotely broadcast signals, wherein the identify device is capable of acknowledging the specific remotely broadcast signals, and wherein the control device causes the display device to show which one of the specific remotely broadcast signals has been acknowledged by the identify device.

9. The apparatus according to claim 1, wherein the specific remotely broadcast signal is one of a plurality of specific remotely broadcast signals, wherein the identify device is capable of simultaneously acknowledging the specific remotely broadcast signals, and wherein, when the identify device simultaneously acknowledges the specific remotely broadcast signals, the control device causes the display device to show independent images each representing that one of the specific remotely broadcast signals has been acknowledged.

10. The apparatus according to claim 9, wherein, when the identify device simultaneously acknowledges the specific remotely broadcast signals, the control device determines whether each of the specific remotely broadcast signals is valid, and causes the display device to show information regarding a valid specific remotely broadcast signal and information regarding an invalid specific remotely broadcast signal in different forms.

11. The apparatus according to claim 1, wherein the identify device identifies the specific remotely broadcast signal through an outside verification and an inside verification, and wherein the control device causes the display device to show in different forms information representing that the specific remotely broadcast signal has been acknowledged through the outside verification and information representing that the specific remotely broadcast signal has been acknowledged through the inside verification.

12. The apparatus according to claim 1, wherein the display device is capable of displaying a first display image and a second display image, wherein the first display image has a predetermined shape, wherein the second display image has a shape different from the shape of the first display image, wherein, when the engine is not running, the display device displays the first display image at a position away from the second display image, and wherein, when the engine is running, the display device displays the first display image contacting the second display image.

13. The apparatus according to claim 1, wherein the display device is capable of displaying a first display image and a second display image, wherein the first display image has a predetermined shape, wherein the second display image has a shape which is different from the shape of the first display image, and wherein, when the engine is running, the display device displays the first display image surrounded by the second display image.

14. The apparatus according to claim 1, wherein, if the start switch is manipulated while the vehicle is running, the control device causes the display device to show a warning.

15. The apparatus according to claim 1, further comprising a manipulation member for operating the start switch, and wherein the display device is covered with the manipulation member.

16. An arrangement of a vehicle engine start apparatus comprising:
an engine start switch located on a center cluster of an instrument panel, wherein a recess is formed in the center cluster, and wherein a manipulation member for operating the engine start switch is attached to a mount surface that defines a part of the recess, and wherein the manipulation member does not project form the recess;
a display device for showing the location of the start switch;
a remote device for outputting a specific remotely broadcast signal representing that the start switch will be operated by an authorized operator;
an identify device for identifying the specific remotely broadcast signal; and
a control device for causing the display device to emit light in accordance with the identification executed by the identify device so as to enable the operator to view the start switch.

17. The arrangement according to claim 16, wherein the mount surface extends in the lateral direction of the vehicle and in the traveling direction of the vehicle.

18. The arrangement according to claim 16, wherein the mount surface is a lower one of a plurality of wall surfaces defining the recess.

19. The arrangement according to claim 16, wherein the mount surface extends in the lateral direction of the vehicle and in the vertical direction of the vehicle.

20. The arrangement according to claim 16, wherein the recess opens rearward in relation to the traveling direction of the vehicle, and wherein dimensions of the recess along the lateral and vertical directions of the vehicle decrease frontward in relation to the traveling direction of the vehicle.

21. A vehicle engine starting apparatus comprising:
a start switch for starting the engine of the vehicle, the start switch being a momentary push switch;
a display device for showing the location of the start switch, the display device being disposed over the start switch or adjacent to the start switch;
a remote device for outputting a specific remotely broadcast signal representing that the start switch will be operated by an authorized operator;
an identify device for identifying the specific remotely broadcast signal; and
a control device for controlling the display device in accordance with the result of the identification executed by the identify device, wherein, when the control device receives a predetermined switching signal, the control device causes the start switch to function as a power switch of on-vehicle electrical devices, and causes the display device to show information representing whether the power switch is ON or OFF.

* * * * *

UNITED STATES PATENT AND TRADEMARK OFFICE
CERTIFICATE OF CORRECTION

PATENT NO. : 6,982,632 B2
DATED : January 3, 2006
INVENTOR(S) : Chikao Nagasaka et al.

It is certified that error appears in the above-identified patent and that said Letters Patent is hereby corrected as shown below:

Column 29,
Line 33, delete "form", and insert -- from --.

Signed and Sealed this

Sixteenth Day of May, 2006

JON W. DUDAS
*Director of the United States Patent and Trademark Office*